United States Patent
Shoop et al.

(10) Patent No.: US 10,956,123 B2
(45) Date of Patent: Mar. 23, 2021

(54) DEVICE AND QUERY MANAGEMENT SYSTEM

(71) Applicant: Rovi Guides, Inc., San Jose, CA (US)

(72) Inventors: David D. Shoop, San Jose, CA (US); Dylan M. Wondra, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/406,813

(22) Filed: May 8, 2019

(65) Prior Publication Data

US 2020/0356338 A1 Nov. 12, 2020

(51) Int. Cl.
*G06F 3/16* (2006.01)
*H04W 4/80* (2018.01)

(52) U.S. Cl.
CPC ............. *G06F 3/167* (2013.01); *H04W 4/80* (2018.02)

(58) Field of Classification Search
CPC ................................. G06F 3/167; H04W 4/80
USPC ........................................................ 455/41.2
See application file for complete search history.

(56) References Cited

U.S. PATENT DOCUMENTS

| | | | |
|---|---|---|---|
| 2008/0155633 A1 | 6/2008 | Watson | |
| 2011/0165912 A1 | 7/2011 | Wang et al. | |
| 2011/0214143 A1 | 9/2011 | Rits et al. | |
| 2012/0075083 A1 | 3/2012 | Isaacs | |
| 2012/0295560 A1 | 11/2012 | Mufti | |
| 2014/0029768 A1 | 1/2014 | Hong et al. | |
| 2015/0113094 A1 | 4/2015 | Williams et al. | |
| 2015/0162006 A1 | 6/2015 | Kummer | |
| 2015/0169066 A1 | 6/2015 | Plagemann et al. | |
| 2015/0188643 A1 | 7/2015 | Ansell | |
| 2015/0382047 A1 | 12/2015 | Van Os et al. | |
| 2016/0019901 A1 | 1/2016 | Topchy et al. | |
| 2018/0322881 A1 | 11/2018 | Min et al. | |
| 2018/0350356 A1 | 12/2018 | Garcia | |
| 2019/0043503 A1 | 2/2019 | Bauer et al. | |
| 2020/0082816 A1 | 3/2020 | Mahajan | |

OTHER PUBLICATIONS

U.S. Appl. No. 16/296,928, filed Mar. 8, 2019.
U.S. Appl. No. 16/296,948, filed Mar. 8, 2019.
U.S. Appl. No. 16/296,953, filed Mar. 8, 2019.

(Continued)

*Primary Examiner* — Eugene Yun
(74) *Attorney, Agent, or Firm* — Young Basile Hanlon & MacFarlane, P.C.

(57) ABSTRACT

A device may include a processor, a receiver, and a transmitter. The transmitter may be configured to transmit an audible signal, an inaudible signal, or both. The inaudible signal may be associated with a content identifier of the audible signal. The transmitter may be configured to transmit the audible signal, the inaudible signal, or both, to a first electronic device, a second electronic device, or both. The receiver may be configured to receive a first message that includes a first input and a second message that includes a second input. The processor may be configured to determine whether the first input matches the second input. The transmitter may be further configured to transmit the first message to the first service on a condition that the first input and the second input are determined to match.

14 Claims, 11 Drawing Sheets

(56) References Cited

OTHER PUBLICATIONS

LISNR Case Studies LISNR the Data-Over-Audio Leader, Oct. 15, 2018, p. 1/1, Discovery Channel. https://lisnr.com/resources/case-studies/ (Last visited Mar. 8, 2019).
International Search Report in International Patent Application No. PCT/US2020/021610, dated Jun. 9, 2020, 4 pgs.
International Search Report in corresponding International Patent Application PCT/US2020/031564 dated Aug. 18, 2020, 16 pages.

DEVICE AND QUERY MANAGEMENT SYSTEM

TECHNICAL FIELD

This disclosure relates to systems and methods for device and query management.

BACKGROUND

Electronic devices, such as voice-activated electronic devices, do not act unless activated by an audible wake word. These audible wake words detract from natural interactions between users and the voice-activated electronic devices. To remove the burden from the user to activate the electronic device, it would be desirable to silently activate the electronic device. It would be desirable to activate the electronic device using a non-interfering communication such that the content for user consumption is not interrupted. It would also be desirable for the system to distinguish audio cues from the content and from the user. It would also be desirable to ensure that the electronic device perform the specific function intended by the user. It would also be desirable for the system to communicate without requiring prior pairing with the electronic device. It would also be desirable to communicate with multiple and varying types of electronic devices simultaneously.

SUMMARY

Disclosed herein are implementations of methods and systems for device and query management. In an aspect, a device may include a transmitter, a receiver, and a processor. The transmitter may be configured to transmit an audible signal, an inaudible signal, or both. The inaudible signal may be associated with a content identifier of the audible signal. The transmitter may be configured to transmit the audible signal, the inaudible signal, or both, to a first electronic device. The first electronic device may be associated with a first service. The transmitter may be configured to transmit the audible signal, the inaudible signal, or both, to a second electronic device. The second electronic device may be associated with a second service. The receiver may be configured to receive a first message that includes a first input. The first input may be associated with the content identifier. The receiver may be configured to receive a second message that includes a second input. The second input may be associated with the content identifier. The processor may be configured to determine whether the first input matches the second input. The transmitter may be further configured to transmit the first message to the first service on a condition that the first input and the second input are determined to match. The transmitter may be further configured to transmit the second message to the second service on a condition that the first input and the second input are determined to be match.

In an aspect, a device may include a receiver, a processor, and a transmitter. The receiver may be configured to receive an audible signal, an inaudible signal, or both. The inaudible signal may be associated with a content identifier of the audible signal. The receiver may be configured to receive a first user input. The first user input may be associated with a first user identifier. The receiver may be configured to receive a second user input. The second user input may be associated with a second user identifier. The processor may be configured to determine whether the first user identifier is associated with an authorized user account. The processor may be configured to determine whether the second user identifier is associated with an authorized user account. The authorized user account for the first and second user identifiers may be the same user account or it may two or more different user accounts. On a condition that the first user identifier is associated with the authorized account, the transmitter may be configured to transmit a first message that includes the first user input. The first user input may be associated with the content identifier.

In an aspect, a method may include transmitting an audible signal, an inaudible signal, or both to a first electronic device. The inaudible signal may be associated with a content identifier of the audible signal. The first electronic device may be associated with a first service. The method may include transmitting the audible signal, the inaudible signal, or both, to a second electronic device. The second electronic device may be associated with a second service. The method may include receiving a first message. The first message may include a first input. The first input may be associated with the content identifier. The method may include receiving a second message. The second message may include a second input. The second input may be associated with the content identifier. The method may include determining whether the first input matches the second input. The method may include transmitting the first message on a condition that the first input and the second input are determined to match. The method may include transmitting the second message on a condition that the first input and the second input are determined to match.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical systems for interactive content consumption require a user to perform multiple steps to activate an electronic device in the context of the content, resulting in a disjointed and undesirable user experience. The embodiments disclosed herein may augment user interaction with content by providing seamless communication between content devices and other electronic devices using inaudible frequencies. The inaudible frequencies may be paired with audible frequencies to enable a non-intrusive and distinct path for electronic device commands without requiring the user to activate the electronic device to initiate the path.

Interactivity with the electronic devices may become problematic in areas that have multiple electronic devices, multiple users, or both. For example, inadvertent duplication of a user response may occur in an area with multiple electronic devices that receive the same user response. In another example, multiple responses from different users may cause duplication of responses. The embodiments disclosed herein may be used to avoid the duplication of the user response.

Figure 1:
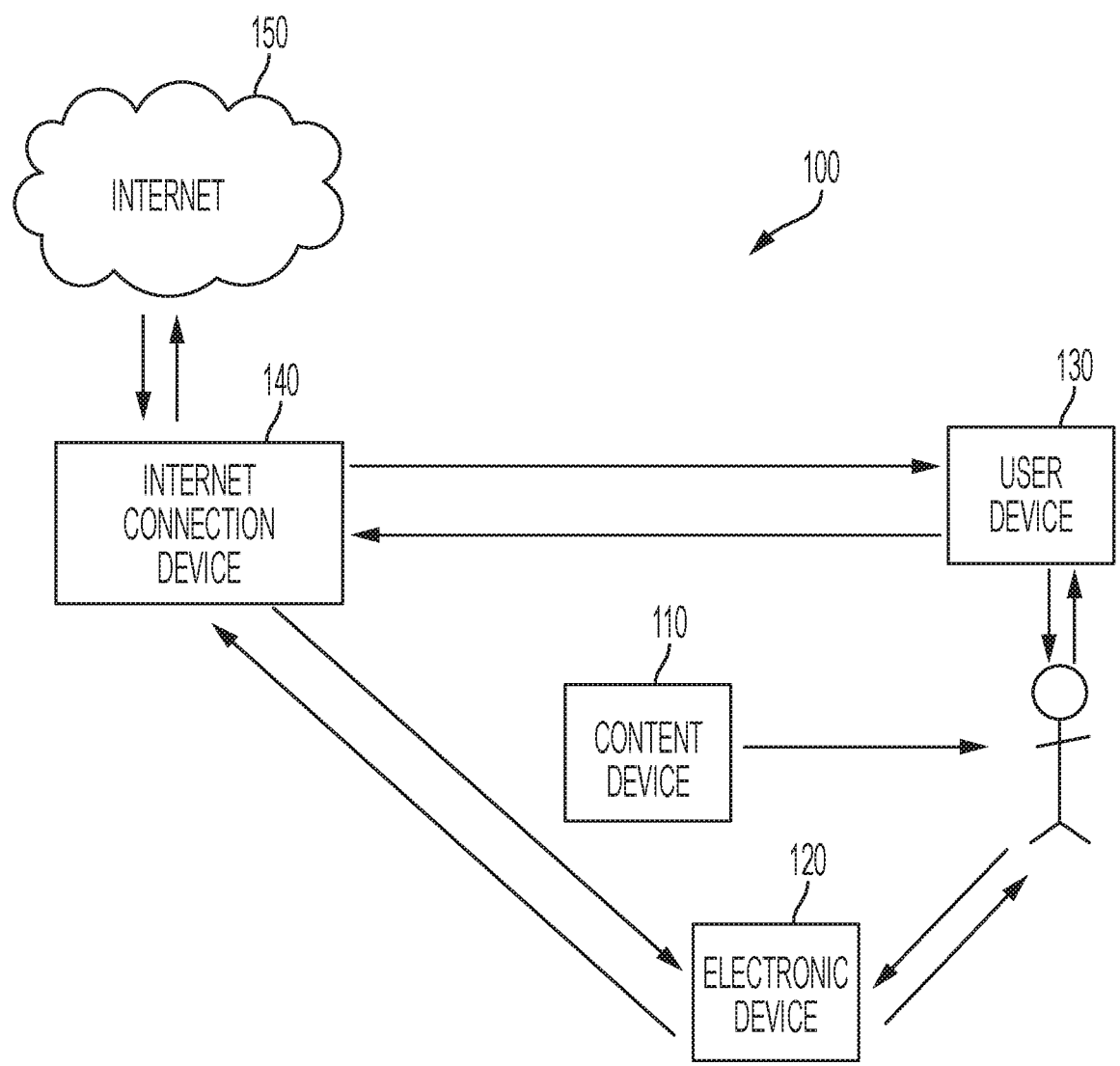
FIG. 1 is a block diagram of an example of a system for content consumption.

FIG. 1 is a block diagram of an example of a system 100 for content consumption. System 100 includes a content device 110, an electronic device 120, and a user device 130. Any number of electronic devices may be included in the system 100, and one is shown in FIG. 1 merely as an example. The electronic device 120 is configured to communicate with the user, the content device 110, and an internet connection device 140. The internet connection device 140 is configured to communicate with the user device 130 and internet 150.

The content device 110 is configured to transmit content to the user. Examples of the content device 110 include, and are not limited to, a television (TV), a personal computer (PC), a tablet, a mobile phone, a gaming device, a satellite receiver, a terrestrial radio receiver, an audio receiver, a set-top-box (STB), a speaker, a camera, a personal wearable device, or an augmented reality/virtual reality (AR/VR) device. The content may include audio content, video content, or both. Audio content may include streaming audio, recorded audio, broadcast audio, point-to-point audio, or any combination thereof. Video content may include streaming video, recorded video, broadcast video, point-to-point video, or any combination thereof. The audio content, video content, or both, may be in real-time or pre-recorded.

Electronic device 120 may be any device configured to interface with the user. Electronic device 120 may include multi-mode capabilities, and may include multiple transceivers for communicating with different wireless networks over different wireless links. For example, electronic device 120 may be configured to communicate with a device that employs a Bluetooth radio technology, and with a base station that employs an IEEE 802 radio technology. For example, electronic device 120 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, an AR/VR device, or any device configured to interface with the user.

The user device 130 may be any device configured to interface with the user. The user device 130 may include multi-mode capabilities, and may include multiple transceivers for communicating with different wireless networks over different wireless links. For example, the user device 130 may be configured to communicate with a base station that employs a cellular-based radio technology, and with the base station that employs an IEEE 802 radio technology. The user device 130 may include, for example, a PC, a tablet, a mobile phone, a gaming device, a personal wearable device, an AR/VR device, or any device configured to interface with the user.

The internet connection device 140 may be a wireless router, Home Node B, Home eNode B, or access point, for example, and may utilize any suitable radio access technology for facilitating wireless connectivity in a localized area, such as a home, a place of business, an educational facility, a vehicle, and the like. The internet connection device 140 may communicate with the user device 130 over an air interface, which may be any suitable wireless communication link, for example, radio frequency (RF), microwave, infrared (IR), ultraviolet (UV), visible light, and the like. The internet connection device 140 may implement a radio technology such as IEEE 802.11 to establish a wireless local area network (WLAN). The internet connection device 140 may implement a radio technology such as IEEE 802.15 to establish a wireless personal area network (WPAN). The internet connection device 140 may utilize a cellular-based radio access technology. Example cellular-based radio access technologies include wide-band code division multiple access (WCDMA), Global System for Mobile communications (GSM), Long Term Evolution (LTE), LTE-Advanced (LTE-A), and the like. As shown in FIG. 1, the internet connection device 140 may have a direct connection to the Internet 150. Alternatively, the internet connection device 140 may access the Internet 150 via a core network (not shown). The Internet 150 may include a global system of interconnected computer networks and devices that use common communication protocols, such as the transmission control protocol (TCP), user datagram protocol (UDP) and the internet protocol (IP) in the TCP/IP internet protocol suite.

Figure 2:
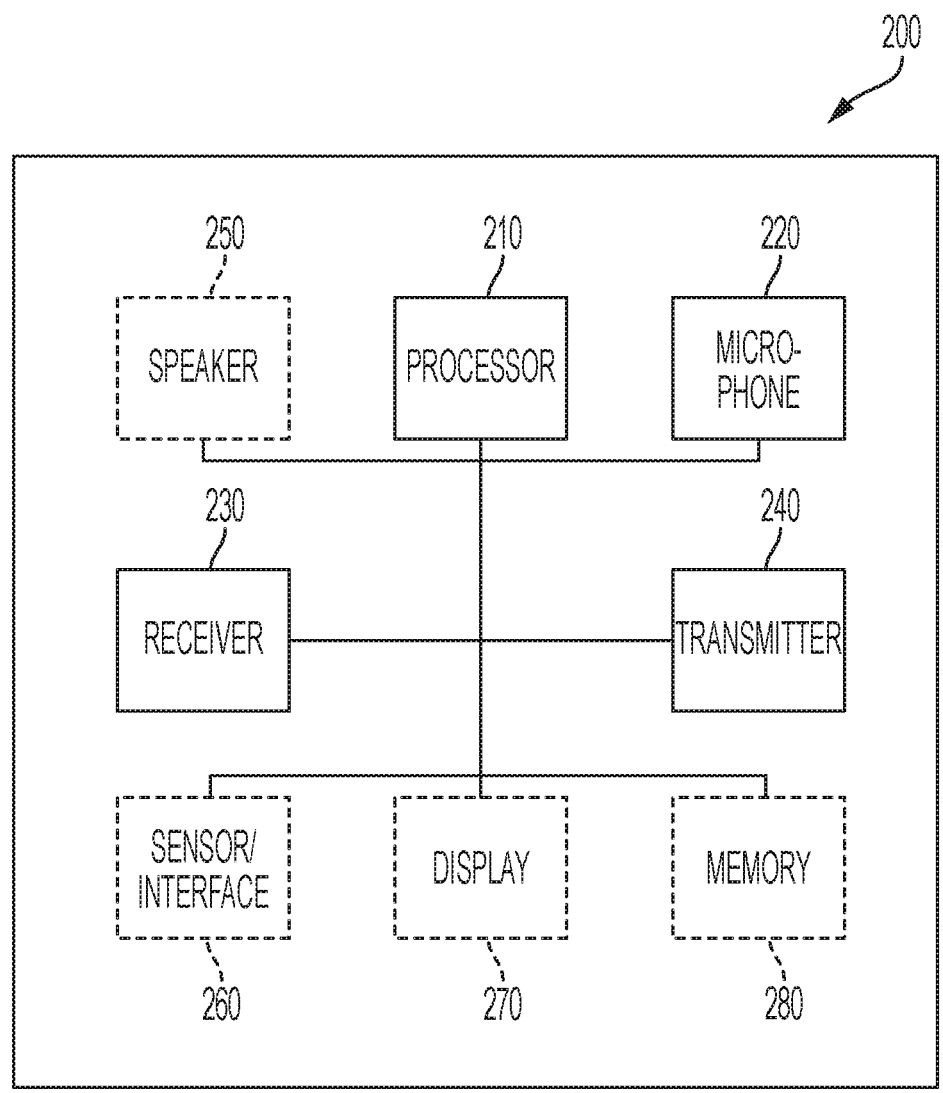
FIG. 2 is a block diagram of an example of an electronic device capable of receiving audible and inaudible inputs in accordance with one or more embodiments of this disclosure.

FIG. 2 is a block diagram of an example of an electronic device 200 capable of receiving audible and inaudible inputs. Example implementations of the electronic device 200 may include the content device 110, electronic device 120, and the user device 130 of FIG. 1. The electronic device 200 includes a processor 210, a microphone 220, a receiver 230, and a transmitter 240. In some implementations, the receiver 230 and transmitter 240 may be combined into a single transceiver unit. In some implementations, the electronic device 200 may include a speaker 250, a sensor/interface 260, a display 270, a memory 280, or any combination thereof.

The processor 210 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 210 may perform signal coding, data processing, power control, input/output processing, and/or any other functionality that enables the electronic device 200 to operate. The processor 210 may be coupled to the receiver 230 and the transmitter 240. While FIG. 2 depicts the processor 210, the receiver 230, and the transmitter 240 as separate components, it will be appreciated that the processor 210, the receiver 230, and the transmitter 240 may be integrated together in an electronic package or chip. The processor 210 may be configured to determine a user profile based on how the user uses the electronic device. For example, the processor may use machine learning to determine the habits of a user to determine the user profile. The processor may be configured to determine whether the electronic device 200 is the intended recipient of the user response. For example, the processor 210 may determine a context of the user response and correlate the user response to the question to determine whether the electronic device 200 is the intended recipient. In another example, the processor 210 may be configured to determine user engagement based on a weighting of the user responses.

The microphone 220 is coupled to the processor 210 and may be configured to receive audible and inaudible inputs. The microphone 220 may include multiple microphones to extend the coverage area of audio capture. An audible input may include any audible signal at frequencies perceptible to a human ear from about 20 Hz to about 20,000 Hz. An inaudible input may include any inaudible signals at frequencies that are not perceptible to the human ear from below 20 Hz and above 20,000 Hz. The microphone 220 may be configured to detect any auditory command, for example, a user voice as a user input. The microphone 220 may be configured to detect a voiceprint in a voice response. For example, the voiceprint may identify a user based on a unique pitch, intonation, inflection, or any combination thereof. The microphone 220 may be configured to distinguish between active and passive users based on signal triangulation of the voice response, distance of the voice response, signal strength of the voice response, or any combination thereof.

The receiver 230 may be configured to receive signals from an internet connection device, for example internet connection device 140 shown in FIG. 1. In some embodiments, the receiver 230 may be an antenna configured to receive inaudible inputs such as RF signals. In some embodiments, the receiver 230 may be a detector configured to receive inaudible inputs such as IR, UV, or visible light signals, for example. In some embodiments, the receiver 230 may be configured to receive both RF and light signals. It will be appreciated that the receiver 230 may be configured to receive any combination of wireless signals.

The transmitter 240 may be configured to transmit signals to an internet connection device, for example internet connection device 140 shown in FIG. 1. In some embodiments, the transmitter 240 may be an antenna configured to transmit RF signals. In some embodiments, the transmitter 240 may be an emitter configured to transmit IR, UV, or visible light signals, for example. In some embodiments, the transmitter 240 may be configured to transmit both RF and light signals. It will be appreciated that the transmitter 240 may be configured to transmit any combination of wireless signals.

The transmitter 240 may be configured to transmit information to other electronic devices to eliminate duplicate records or user responses.

The speaker 250 may be coupled to the processor 210 and may be configured to emit audible and inaudible signals. The speaker 250 may include multiple speakers to extend the sound field.

The sensor/interface 260 may be coupled to the processor 210 and may include one or more software and/or hardware modules that provide additional features, functionality and/or wired or wireless connectivity. For example, the sensor/interface 260 may include an accelerometer, an e-compass, a satellite transceiver, an image sensor (for photographs or video), a universal serial bus (USB) port, a vibration device, a television transceiver, a hands free headset, a Bluetooth® module, a frequency modulated (FM) radio unit, a digital music player, a media player, a video game player module, a keyboard, an Internet browser, and the like. The sensor/interface 260 may be configured to detect motion-based or gesture-based commands. The sensor/interface 260 may be configured to perform facial recognition. For example, facial recognition may be used to correlate a user response to a specific user and to determine which user responses to ignore. For example, if a user is not recognized via facial recognition, a response from that user may be ignored. In some implementations, the sensor/interface 260 may be configured to detect a sign gait or a walk gait of a user to identify the user. A sign gait may function as a virtual fingerprint of a user based on how the user performs specific gestures or signs. A walk gait may function as a virtual fingerprint of a user based on a unique walking gait of the user.

The display 270 may be coupled to the processor 210 and may be a liquid crystal display (LCD) display unit, a light emitting diode (LED) display unit, or an organic light-emitting diode (OLED) display unit. The display 270 may be configured to receive user input, for example, the display 270 may be a capacitive touch display in some embodiments.

The memory 280 may be coupled to the processor 210. The memory 280 may include volatile memory, persistent storage, or both. Volatile memory may include random access memory (RAM), dynamic random access memory (DRAM), static random access memory (SRAM), and the like. Persistent storage may include read-only memory (ROM), a hard disk, or any other type of memory storage device. Persistent storage may include a removable storage element such as a memory stick, a secure digital (SD) memory card, and the like. The memory may be configured to store a usage profile of a user, a voiceprint of the user, a walk gait of the user, a gesture gait of the user, a sign gait of the user, or any combination thereof.

Figure 3:
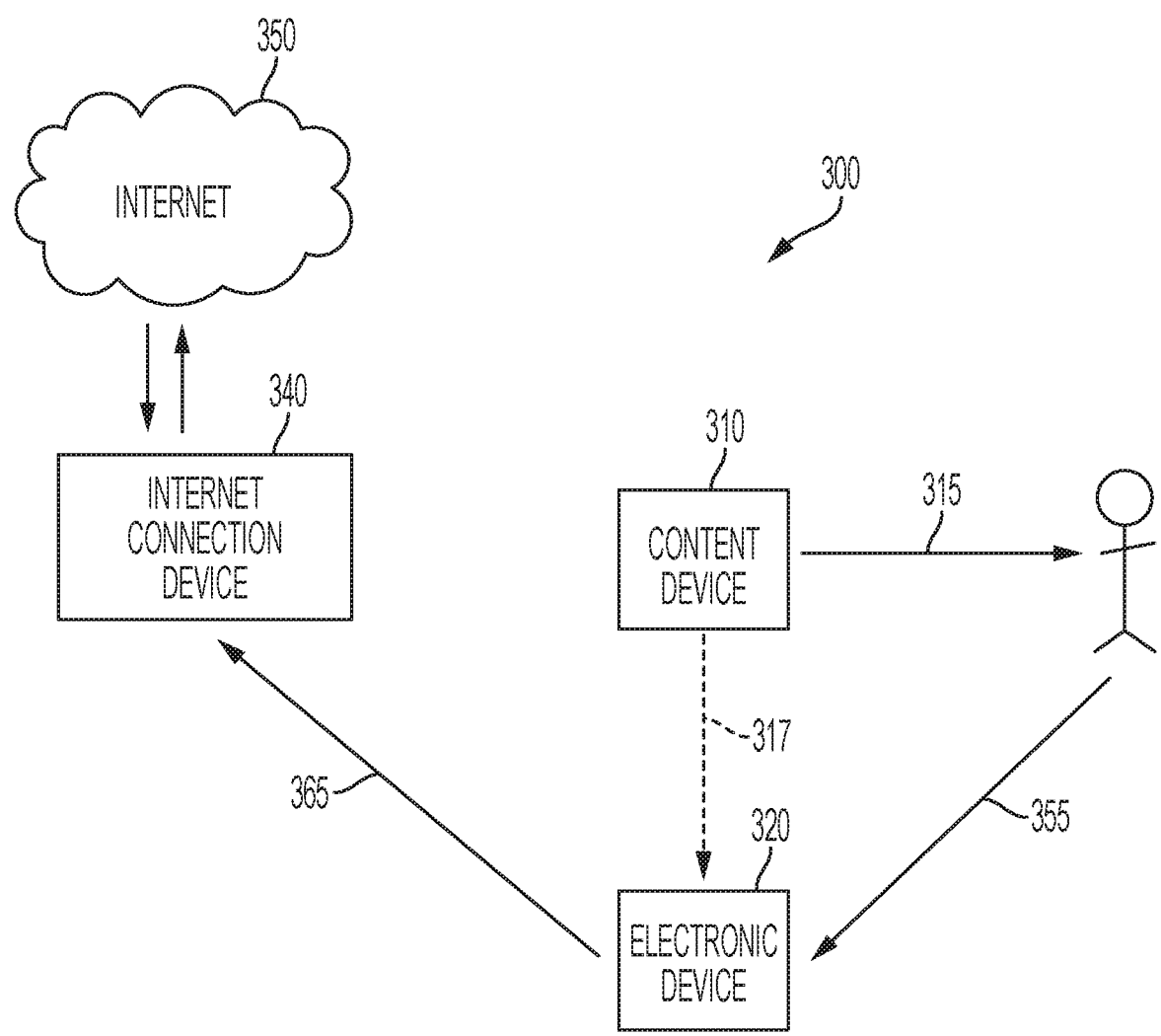
FIG. 3 is a functional block diagram of an example of a system with a single electronic device and a single user in accordance with one or more embodiments of this disclosure.

FIG. 3 is a functional block diagram of an example of a system 300 with a single electronic device and a single user in accordance with one or more embodiments of this disclosure. The system 300 includes a content device 310 and an electronic device 320. The electronic device 320 is configured to communicate with the user, the content device 310, and an internet connection device 340. The internet connection device 340 is configured to communicate with the internet 350. The content device 310 and the electronic device 320 may each include one or more components of the electronic device 200 shown in FIG. 2.

The system 300 is configured to detect an inaudible signal in content that is presented to a user and queue the electronic device 320 to respond in context of the content. The system 300 may generate one or more possible responses based on the context of the content. The system 300 goes beyond activating the electronic device 320 to be ready to detect a user response by activating a response monitor in the context of the content, a specific activity, software application, or any combination thereof. The system 300 may allow the user to naturally respond to an audible or visual prompt by associating an inaudible signal with an audible or visual signal. The system 300 may enhance user interactivity by setting the electronic device 320 to be in a prepared state for a specific context, for example an advertising context, without the user having to provide the context. For example, associating an inaudible signal with an audible signal may allow the user to interact with content without having to use a wake command. The system 300 is configured to communicate using inaudible signals without requiring prior pairing between the content device 310 and the electronic device 320. In some embodiments, the system 300 may be configured to control an environmental condition based on the context of the content.

Referring to FIG. 3, the content device 310 is configured to transmit content to the user. Examples of the content device 310 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 3, the content device 310 is configured to transmit content to a user. The content may include audio content, video content, or both. The audio content may include audible signals, inaudible signals, or both. For example, the audio content may include an audible signal 315 that is paired or associated with an inaudible signal 317. The audible signal 315 may include an audible advertisement that is intended to elicit a response from the user. The inaudible signal 317 may be paired with or associated with the audible signal 315. The inaudible signal 317 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

The electronic device 320 may be any device configured to interface with the user and a source device. The electronic device 320 may include multi-mode capabilities, and may include multiple transceivers for communicating with different wireless networks over different wireless links. For example, the electronic device 320 may be configured to communicate with a device employs a Bluetooth radio technology, and with a base station that employs an IEEE 802 radio technology. For example, the electronic device 320 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

The electronic device 320 may receive an audio input. The audio input may include an audible signal, an inaudible signal, or both. In an example, the electronic device 320 may be configured to detect an inaudible signal in the audio input, for example the inaudible signal 317 from the content device 310. The electronic device 320 may have a service associated with the electronic device 320 that may be configured to contact a service associated with the content device 310 via a service adapter (not shown). A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 310, via the service associated with the content device 310, may be configured to validate a user account and associate the user account with a user. The service associated with the content device 310 may be configured to open a communication link with the service associated with the electronic device 320. The electronic device 320, via the service associated with the electronic device 320, may be configured to transmit a content ID to the service associated with the content device 310. The electronic device 320 may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 317, the wake command of the inaudible signal 317, or both. The electronic device 320 may activate the response monitor for a predetermined time. The response monitor may be a voice response monitor that is configured to monitor audio inputs for a user response 355. The user response 355 may be a voice input, a gesture, a text input, a touch input, or any suitable input. In an example, by activating the response monitor, the electronic device 320 may monitor audio inputs for one or more predetermined user responses and queue a contextual response based on the audio input, for example, the user response 355 to the advertisement. In another example, by activating the response monitor, the electronic device 320 may monitor an audio input for a user response 355, queue one or more contextual responses based on the audio input, and determine whether the user response 355 corresponds to the one or more contextual responses. For example, the electronic device 320 may determine a content characteristic of the advertisement in audible signal 315 based on the inaudible signal 317. The electronic device 320 may be configured to generate one or more messages based on the content characteristic of the advertisement. Each generated message may be a contextual response to the advertisement. The electronic device 320 may be configured to transmit the one or more messages if the electronic device 320 determines that the user response 355 corresponds to at least one of the one or more messages. The electronic device 320 may be configured to transmit the message 365 to internet connection device 340. The message 365 may be transmitted using RF or any suitable wired or wireless communication link.

The internet connection device 340 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 340 may communicate with the electronic device 320 over an air interface, which may be any suitable wireless communication link, for example, RF, microwave, IR, UV, visible light, and the like. The internet connection device 340 may implement a radio technology such as IEEE 802.11 to establish a WLAN. The internet connection device 340 may implement a radio technology such as IEEE 802.15 to establish a WPAN. The internet connection device 340 may utilize a cellular-based access technology. Example cellular-based access technologies include WCDMA, GSM, LTE, LTE-A, and the like. As shown in FIG. 3, the internet connection device 340 may have a direct connection to the Internet 350. Alternatively, the internet connection device 340 may access the Internet 350 via a core network (not shown). The Internet 350 may include a global system of interconnected computer networks and devices that use common communication protocols, such as the TC, UDP and the IP in the TCP/IP internet protocol suite.

The internet connection device 340 may receive the message 365 and retrieve information regarding the advertisement based on the user response 355. The information regarding the advertisement may be retrieved from the internet 350. The information regarding the advertisement may be for a specific product or service based on the content ID. The internet connection device 340 may transmit the retrieved information 475 to any device, for example the electronic device 320. The information regarding the advertisement may be transmitted to the electronic device 320 without the user having to use any wake commands while interacting with the content.

Figure 4:
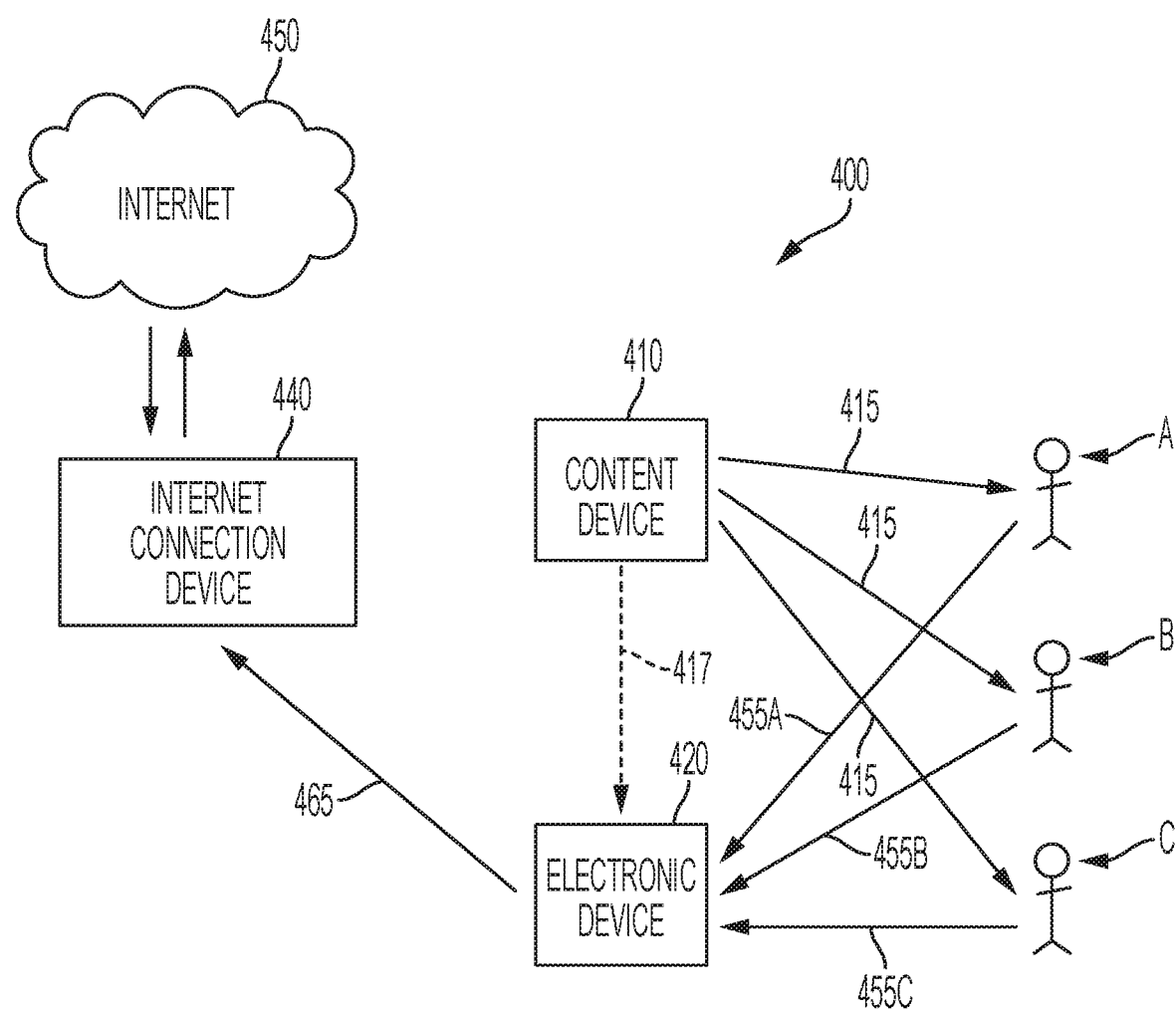
FIG. 4 is a functional block diagram of an example of a system with a single electronic device and multiple users in accordance with one or more embodiments of this disclosure.

FIG. 4 is a functional block diagram of an example of a system 400 with a single electronic device and multiple users in accordance with one or more embodiments of this disclosure. The system 400 includes a content device 410 and an electronic device 420. The electronic device 420 is configured to communicate with user A, user B, and user C, the content device 410, and an internet connection device 440. The internet connection device 440 is configured to communicate with the internet 450. The content device 410 and the electronic device 420 may each include one or more components of the electronic device 200 shown in FIG. 2.

The system 400 is configured to detect an inaudible signal in content that is presented to a user and queue the electronic device 420 to respond in context of the content, as described above with reference to FIG. 3. Referring to FIG. 4, the content device 410 is configured to transmit content to the user, for example user A, user B, and user C. Examples of the content device 410 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 4, the content device 410 is configured to transmit content to a user. The content may include audio content, video content, or both. The audio content may include audible signals, inaudible signals, or both. For example, the audio content may include an audible signal 415 that is paired or associated with an inaudible signal 417. The audible signal 415 may include an audible advertisement that is intended to elicit a response from the user. The inaudible signal 417 may be paired with or associated with the audible signal 415. The inaudible signal 417 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 4, the electronic device 420 may be any device configured to interface with user A, user B, user C, and a source device (not shown). The electronic device 420 may include multi-mode capabilities, and may include multiple transceivers for communicating with different wireless networks over different wireless links. For example, the electronic device 420 may be configured to communicate with a device that employs a Bluetooth radio technology, and with a base station that employs an IEEE 802 radio technology. For example, the electronic device 420 may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

The electronic device 420 may receive an audio input. The audio input may include an audible signal, an inaudible signal, or both. In an example, the electronic device 420 may be configured to detect an inaudible signal in the audio input, for example the inaudible signal 417 from the content device 410. The electronic device 420 may have a service associated with the electronic device 420 that may be configured to contact a service associated with the content device 410 via a service adapter (not shown). A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 410, via the service associated with the content device 410, may be configured to validate a user account and associate the user account with a user. For example, user A may be associated with user account A, user B may be associated with user account B, and user C may be associated with user account C. In some examples, multiple users may be associated with a single user account.

The service associated with the content device 410 may be configured to open a communication link with the service associated with the electronic device 420. The electronic device 420, via the service associated with the electronic device 420, may be configured to transmit a content ID to the service associated with the content device 410. The electronic device 420 may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 417, the wake command of the inaudible signal 417, or both. The electronic device 420 may activate the response monitor for a predetermined time. The response monitor may be a voice response monitor that is configured to monitor audio inputs for a user response.

As shown in FIG. 4, the electronic device 420 receives user response 455A from user A, user response 455B from user B, and user response 455C from user C. Each user response 455A, 455b, 455C may be a voice input, a gesture, a text input, a touch input, or any suitable input. One or more of user responses 455A, 455B, or 455C may include a user identifier that identifies the user, for example a voiceprint associated with a user or user account or a gesture gait associated with a user or user account. The electronic device 420 may be configured to determine whether one or more user identifiers are associated with one or more authorized user accounts.

The electronic device 420 may create a unique record for one or more of received user response 455A, user response 455B, or user response 455C. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

The electronic device 420 may create a unique record for the first received user response. For example, if user response 455C is received prior to receiving user response 455A and user response 455B, electronic device 420 may create a unique record for user response 455C. The electronic device 420 may create a unique for each received user response. For example, the electronic device 420 may create a unique record for each of user response 455A, user response 455B, and user response 455C. In another example, the electronic device 420 may create a single unique record that includes each of user response 455A, user response 455B, and user response 455C. The electronic device 420 may be configured to encode the unique record into message 465 and transmit the message 465 to internet connection device 440. The message 465 may be transmitted using RF or any suitable wired or wireless communication link. In an example, the electronic device 420 may be configured to authenticate each received user response, and transmit only the user responses that are associated with an authenticated (i.e., authorized) user account.

The internet connection device 440 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 440 may communicate with the electronic device 420 over an air interface, which may be any suitable wireless communication link, for example, RF, microwave, IR, UV, visible light, and the like. The internet connection device 440 may implement a radio technology such as IEEE 802.11 to establish a WLAN. The internet connection device 440 may implement a radio technology such as IEEE 802.15 to establish a WPAN. The internet connection device 440 may utilize a cellular-based access technology. Example cellular-based access technologies include WCDMA, GSM, LTE, LTE-A, and the like. As shown in FIG. 4, the internet connection device 440 may have a direct connection to the Internet 450. Alternatively, the internet connection device 440 may access the Internet 450 via a core network (not shown). The Internet 450 may include a global system of interconnected computer networks and devices that use common communication protocols, such as the TC, UDP and the IP in the TCP/IP internet protocol suite.

The internet connection device 440 may receive the message 465 and retrieve information regarding the advertisement based on one or more of user responses 455A, 455B, or 455C. For Example, if user response 455A and user response 455C are determined to be associated with one or more authorized user accounts, the internet connection device may retrieve information regarding the advertisement based on the respective user responses. The information regarding the advertisement may be retrieved from the internet 450. The information regarding the advertisement may be for a specific product or service based on the content ID. The internet connection device 440 may transmit the retrieved information to the electronic device 420 or any other device for storage or presentation to one or more users without the users having to use any wake commands while interacting with the content. The information regarding the advertisement may be presented as an audio presentation, video presentation, or any other suitable presentation.

In some scenarios, multiple electronic devices may be in the vicinity of a user consuming content. For example, the user may be consuming video content in the living room of his home. The video content may include an audio portion that that includes a question requesting user input. The living room may include one or more electronic devices, such as a mobile phone, a voice assistant, or both, that may be used to interact with the content. Typically, the user would have to invoke a wake command for their specific electronic device and then speak another voice command to answer the question. In this situation, having to invoke a wake command results in a disjointed and undesirable user experience. In this example, the user may also have another electronic device, such as a voice assistant, in the kitchen that is capable of interacting with the content. The user may respond to the question in the living room, however, that response may be detected by the mobile phone in the living room, the voice assistant in the living room, the voice assistant in the kitchen, or any combination thereof. Since multiple electronic devices are in close proximity to each other, there is an increased chance that one or more of the electronic devices receives a duplicate or redundant response from the user in the living room.

Figure 5:
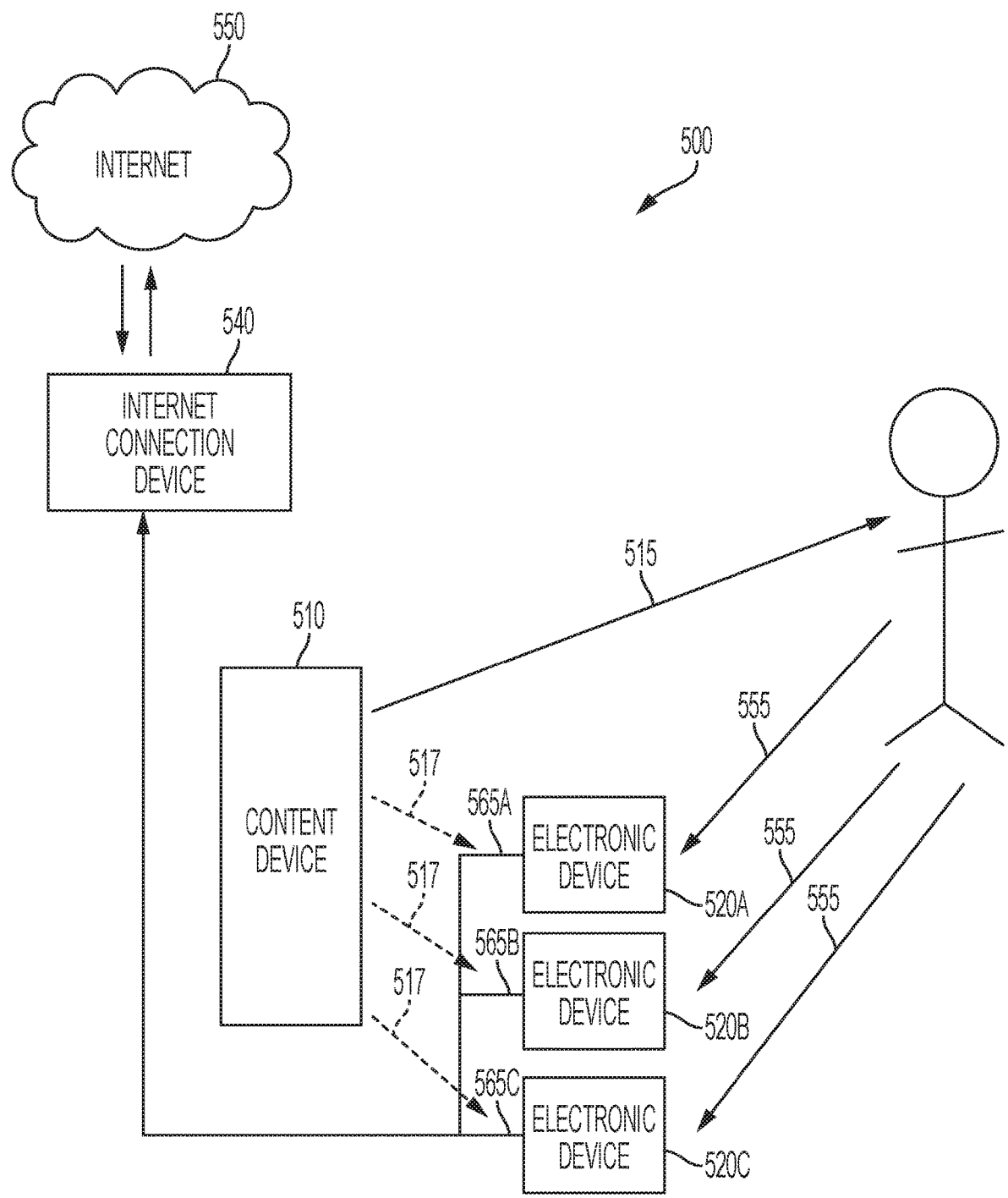
FIG. 5 is a functional block diagram of an example of a system with multiple electronic devices and a single user in accordance with one or more embodiments of this disclosure.

FIG. 5 is a functional block diagram of an example of a system 500 with multiple electronic devices and a single user in accordance with one or more embodiments of this disclosure. The system 500 includes a content device 510, an electronic device 520A, an electronic device 520B, and an electronic device 520C. Each electronic device 520A, 520B, and 520C is configured to communicate with a user, the content device 510, and an internet connection device 540. The internet connection device 540 is configured to communicate with the internet 550. The content device 510, the electronic device 520A, the electronic device 520B, and the electronic device 520C may each include one or more components of the electronic device 200 shown in FIG. 2.

The system 500 is configured to detect an inaudible signal in content that is presented to a user and queue one or more of the electronic devices 520A, 520B, and 520C to respond in context of the content, as described above with reference to FIG. 3. Referring to FIG. 5, the content device 510 is configured to transmit content to the user. Examples of the content device 510 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 5, the content device 510 is configured to transmit content to a user. The content may include audio content, video content, or both. The audio content may include audible signals, inaudible signals, or both. For example, the audio content may include an audible signal 515 that is paired or associated with an inaudible signal 517. The audible signal 515 may include an audible advertisement that is intended to elicit a response from the user. The inaudible signal 517 may be paired with or associated with the audible signal 515. The inaudible signal 517 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 5, each of the electronic devices 520A, 520B, and 520C may be any device configured to interface with the user and a source device (not shown). One or more of the electronic devices 520A, 520B, and 520C may include multi-mode capabilities, and may include multiple transceivers for communicating with different wireless networks over different wireless links. For example, each electronic device 520A, 520B, 520C may be configured to communicate with a device that employs a Bluetooth radio technology, and with a base station that employs an IEEE 802 radio technology. For example, each electronic device 520A, 520B, 520C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

Each of the electronic devices 520A, 520B, and 520C may receive an audio input. The audio input may include an audible signal, an inaudible signal, or both. In an example, each of the electronic devices 520A, 520B, and 520C may be configured to detect an inaudible signal in the audio input, for example the inaudible signal 517 from the content device 510. Each electronic device 520A, 520B, 520C may have a service associated with the respective electronic device 520A, 520B, 520C that may be configured to contact a service associated with the content device 510 via a service adapter (not shown). A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 510, via the service associated with the content device 510, may be configured to validate a user account and associate the user account with a user.

The service associated with the content device 510 may be configured to open a communication link with the service associated with each of the electronic devices 520A, 520B, and 520C. The electronic devices 520A, 520B, and 520C, via the service associated with the electronic devices 520A, 520B, and 520C, may be configured to transmit a content ID to the service associated with the content device 510. Each of the electronic devices 520A, 520B, and 520C may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 517, the wake command of the inaudible signal 517, or both. Each of the electronic devices 520A, 520B, and 520C may activate the response monitor for a predetermined time. The response monitor may be a voice response monitor that is configured to monitor audio inputs for a user response.

As shown in FIG. 5, each electronic device 520A, 520B, and 520C receives user response 555 from the user. The user response 555 may be a voice input, a gesture, a text input, a touch input, or any suitable input. The user response 555 may include a user identifier that identifies the user, for example a voiceprint associated with a user or user account or a gesture gait associated with a user or user account. Each of the electronic devices 520A, 520B, and 520C may be configured to determine whether the user identifier is associated with an authorized user account.

Each of the electronic devices 520A, 520B, and 520C may create a unique record for the received user response 555. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

Each of the electronic devices 520A, 520B, and 520C may be configured to respectively encode a unique record into message 565A, message 565B, and message 565C and respectively transmit the message 565A, 565B, 565C to internet connection device 540. Each of the messages 565A, 565B, and 565C may be transmitted using RF or any suitable wired or wireless communication link. In an example, one or more of the electronic devices 520A, 520B, and 520C may be configured to authenticate each received user response, and transmit only the user responses that are associated with an authenticated (i.e., authorized) user account.

The internet connection device 540 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 540 may communicate with electronic devices 520A, 520B, 520C over an air interface, which may be any suitable wireless communication link, for example, RF, microwave, IR, UV, visible light, and the like. The internet connection device 540 may implement a radio technology such as IEEE 802.11 to establish a WLAN. The internet connection device 540 may implement a radio technology such as IEEE 802.15 to establish a WPAN. The internet connection device 540 may utilize a cellular-based access technology. Example cellular-based access technologies include WCDMA, GSM, LTE, LTE-A, and the like. As shown in FIG. 5, the internet connection device 540 may have a direct connection to the Internet 550. Alternatively, the internet connection device 540 may access the Internet 550 via a core network (not shown). The Internet 550 may include a global system of interconnected computer networks and devices that use common communication protocols, such as the TC, UDP and the IP in the TCP/IP internet protocol suite.

The internet connection device 540 may receive each of the messages 565A, 565B, and 565C and retrieve information regarding the advertisement based the user response 555. For example, the internet connection device 540 may determine whether one or more of the received messages 565A, 565B, and 565C are duplicates based on one or more fields of the unique record including the date stamp, the time stamp, the content ID, the content device serial number, the content device manufacturer, the content device model, the content device IP address, the content device geographical location, the electronic device serial number, the electronic device manufacturer, the electronic device model, the electronic device IP address, the electronic device geographical location, one or more user responses, the user account, or the user ID associated with the user account.

In an example, if the internet connection device 540 determines that message 565A and 565B are duplicate messages, the internet connection device may transmit only message 565A or 565B to the internet 550 to avoid duplicate transmissions. In another example, the internet connection device 540 may transmit messages 565A, 565B, and 565C to the internet 550. In this example, the internet 550 may be configured to determine that message 565A and 565B are duplicate messages, and the internet 550 may retrieve and transmit a response based on only message 565A or 565B to the internet connection device 540 to avoid duplication. The information regarding the advertisement may be retrieved from the internet 550. The information regarding the advertisement may be for a specific product or service based on the content ID. The information regarding the advertisement may be transmitted to the electronic device 520 or any other device for storage or presentation to one or more users without the users having to use any wake commands while interacting with the content. The information regarding the advertisement may be presented as an audio presentation, video presentation, or any other suitable presentation.

Figure 6:
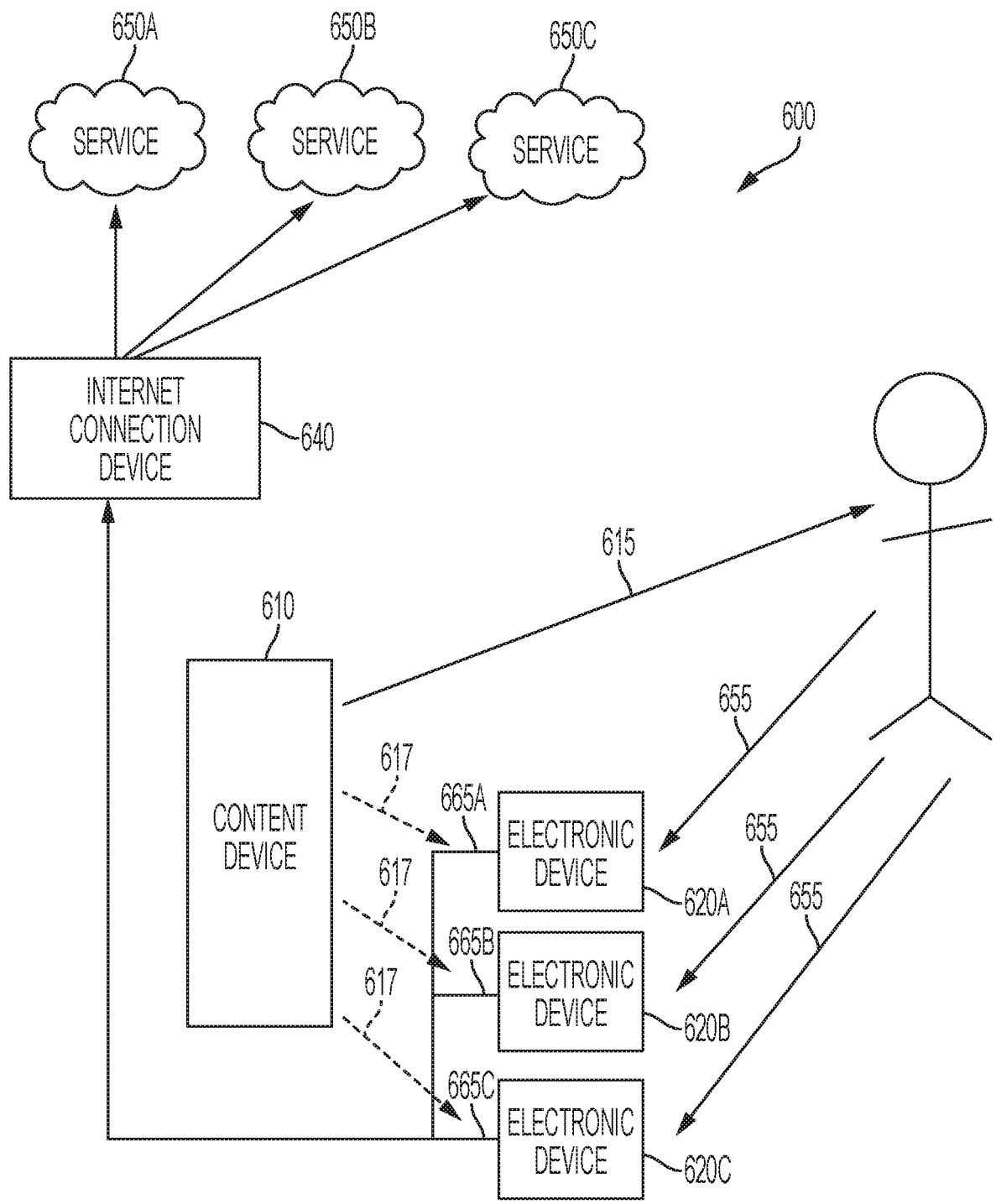
FIG. 6 is a functional block diagram of an example of a system with multiple electronic devices associated with multiple services and a single user in accordance with one or more embodiments of this disclosure.

FIG. 6 is a functional block diagram of an example of a system 600 with multiple electronic devices associated with multiple services and a single user in accordance with one or more embodiments of this disclosure. The system 600 includes a content device 610, an electronic device 620A, an electronic device 620B, and an electronic device 620C. Each electronic device 620A, 620B, and 620C is configured to communicate with a user, the content device 610, and an internet connection device 640. The internet connection device 640 is configured to communicate with one or more services, for example service 650A, service 650B, and service 650C. The content device 610, the electronic device 620A, the electronic device 620B, and the electronic device 620C may each include one or more components of the electronic device 200 shown in FIG. 2.

The system 600 is configured to detect an inaudible signal in content that is presented to a user and queue one or more of the electronic devices 620A, 620B, and 620C to respond in context of the content, as described above with reference to FIG. 3. Referring to FIG. 6, the content device 610 is configured to transmit content to the user. Examples of the content device 610 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 6, the content device 610 is configured to transmit content to a user. The content may include audio content, video content, or both. The audio content may include audible signals, inaudible signals, or both. For example, the audio content may include an audible signal 615 that is paired or associated with an inaudible signal 617. The audible signal 615 may include an audible advertisement that is intended to elicit a response from the user. The inaudible signal 617 may be paired with or associated with the audible signal 615. The inaudible signal 617 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 6, each of the electronic devices 620A, 620B, and 620C may be any device configured to interface with the user and a source device (not shown). One or more of the electronic devices 620A, 620B, and 620C may include multi-mode capabilities, and may include multiple transceivers for communicating with different wireless networks over different wireless links. For example, each electronic device 620A, 620B, 620C may be configured to communicate with a device that employs a Bluetooth radio technology, and with a base station that employs an IEEE 802 radio technology. For example, each electronic device 620A, 620B, 620C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

Each of the electronic devices 620A, 620B, and 620C may receive an audio input. The audio input may include an audible signal, an inaudible signal, or both. In an example, each of the electronic devices 620A, 620B, and 620C may be configured to detect an inaudible signal in the audio input, for example the inaudible signal 617 from the content device 610. Each electronic device 620A, 620B, 620C may have a service associated with the respective electronic device 620A, 620B, 620C that may be configured to contact a service associated with the content device 610 via a service adapter (not shown). For example, electronic device 620A may be associated with service 650A, electronic device 620B may be associated with service 650B, and electronic device 620C may be associated with service 650C. A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 610, via the one or more services associated with the content device 610, may be configured to validate a user account and associate the user account with a user.

The one or more services associated with the content device 610 may be configured to open a communication link with the respective service associated with each of the electronic devices 620A, 620B, and 620C. The electronic devices 620A, 620B, and 620C, via the service associated with the electronic devices 620A, 620B, and 620C, may be configured to transmit a content ID to the service associated with the content device 610. Each of the electronic devices 620A, 620B, and 620C may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 617, the wake command of the inaudible signal 617, or both. Each of the electronic devices 620A, 620B, and 620C may activate the response monitor for a predetermined time. The response monitor may be a voice response monitor that is configured to monitor audio inputs for a user response.

As shown in FIG. 6, each electronic device 620A, 620B, and 620C receives user response 655 from the user. The user response 655 may be a voice input, a gesture, a text input, a touch input, or any suitable input. The user response 655 may include a user identifier that identifies the user, for example a voiceprint associated with a user or user account or a gesture gait associated with a user or user account. Each of the electronic devices 620A, 620B, and 620C may be configured to determine whether the user identifier is associated with an authorized user account.

Each of the electronic devices 620A, 620B, and 620C may create a unique record for the received user response 655. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

Each of the electronic devices 620A, 620B, and 620C may be configured to respectively encode a unique record into message 665A, message 665B, and message 665C and respectively transmit the messages 665A, 665B, 665C to internet connection device 640. Each of the messages 665A, 665B, and 665C may be transmitted using RF or any suitable wired or wireless communication link. In an example, one or more of the electronic devices 620A, 620B, and 620C may be configured to authenticate each received user response, and transmit only the user responses that are associated with an authenticated (i.e., authorized) user account.

The internet connection device 640 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 640 may communicate with electronic devices 620A, 620B, 620C over an air interface, which may be any suitable wireless communication link, for example, RF, microwave, IR, UV, visible light, and the like. The internet connection device 640 may implement a radio technology such as IEEE 802.11 to establish a WLAN. The internet connection device 640 may implement a radio technology such as IEEE 802.15 to establish a WPAN. The internet connection device 640 may utilize a cellular-based access technology. Example cellular-based access technologies include WCDMA, GSM, LTE, LTE-A, and the like. As shown in FIG. 6, the internet connection device 640 may have a direct connection to one or more services, for example service 650A, service 650B, and service 650C. Alternatively, the internet connection device 640 may access the one or more services 650A, 650B, 650C via a core network (not shown). Each service 650A, 650B, 650C may include a global system of interconnected computer networks and devices that use common communication protocols, such as the TC, UDP and the IP in the TCP/IP internet protocol suite.

The internet connection device 640 may receive each of the messages 665A, 665B, and 665C and retrieve information regarding the advertisement based the user response 655. For example, the internet connection device 640 may determine whether one or more of the received messages 665A, 665B, and 665C are duplicates based on one or more fields of the unique record including the date stamp, the time stamp, the content ID, the content device serial number, the content device manufacturer, the content device model, the content device IP address, the content device geographical location, the electronic device serial number, the electronic device manufacturer, the electronic device model, the electronic device IP address, the electronic device geographical location, one or more user responses, the user account, or the user ID associated with the user account.

In an example, if the internet connection device 640 determines that message 665A and 665B are associated with the same user, the internet connection device 640 may transmit only message 665A or 665B to the respective service to avoid duplicate transmissions. In another example, the internet connection device 640 may transmit messages 665A, 665B, and 665C to each respective service 650A, 650B, 650C. In this example, each service 650A, 650B, 650C may be configured to log each message and retrieve and transmit a response based each message to the internet connection device 640. The information regarding the advertisement may be retrieved from one or more respective services. The information regarding the advertisement may be for a specific product or service based on the content ID. The information regarding the advertisement may be transmitted to one or more of electronic device 620A, 620B, 620C or any other device for storage or presentation to one or more users without the users having to use any wake commands while interacting with the content. The information regarding the advertisement may be presented as an audio presentation, video presentation, or any other suitable presentation.

In some scenarios, multiple users may be in close proximity to each other and consuming the same content. Each of the multiple users may have their own electronic device, for example a mobile phone, that may be used to interact with the content being consumed. For example, multiple users may be listening to a radio broadcast in a vehicle. The radio broadcast may ask for user input, for example, in the form of a polling question. Typically, each user would have to invoke a wake command for their specific electronic device and then speak another voice command to answer the polling question. In this situation, having to invoke a wake command results in a disjointed and undesirable user experience. In addition, since multiple users are in close proximity to each other, there is an increased chance that one or more of the electronic devices receives a duplicate or redundant user response from multiple users. Implementing an inaudible signal that alerts the other electronic devices in the vicinity that a user response has been received would allow each user to interact with the electronic device with a natural response, without invoking a wake command, provide a seamless and enjoyable user experience, and avoid duplicate or redundant user responses. In this example, a number of electronic devices may receive responses from multiple users and process one of the received responses based on a voice identification match. The duplicate responses may be stored or discarded.

Figure 7:
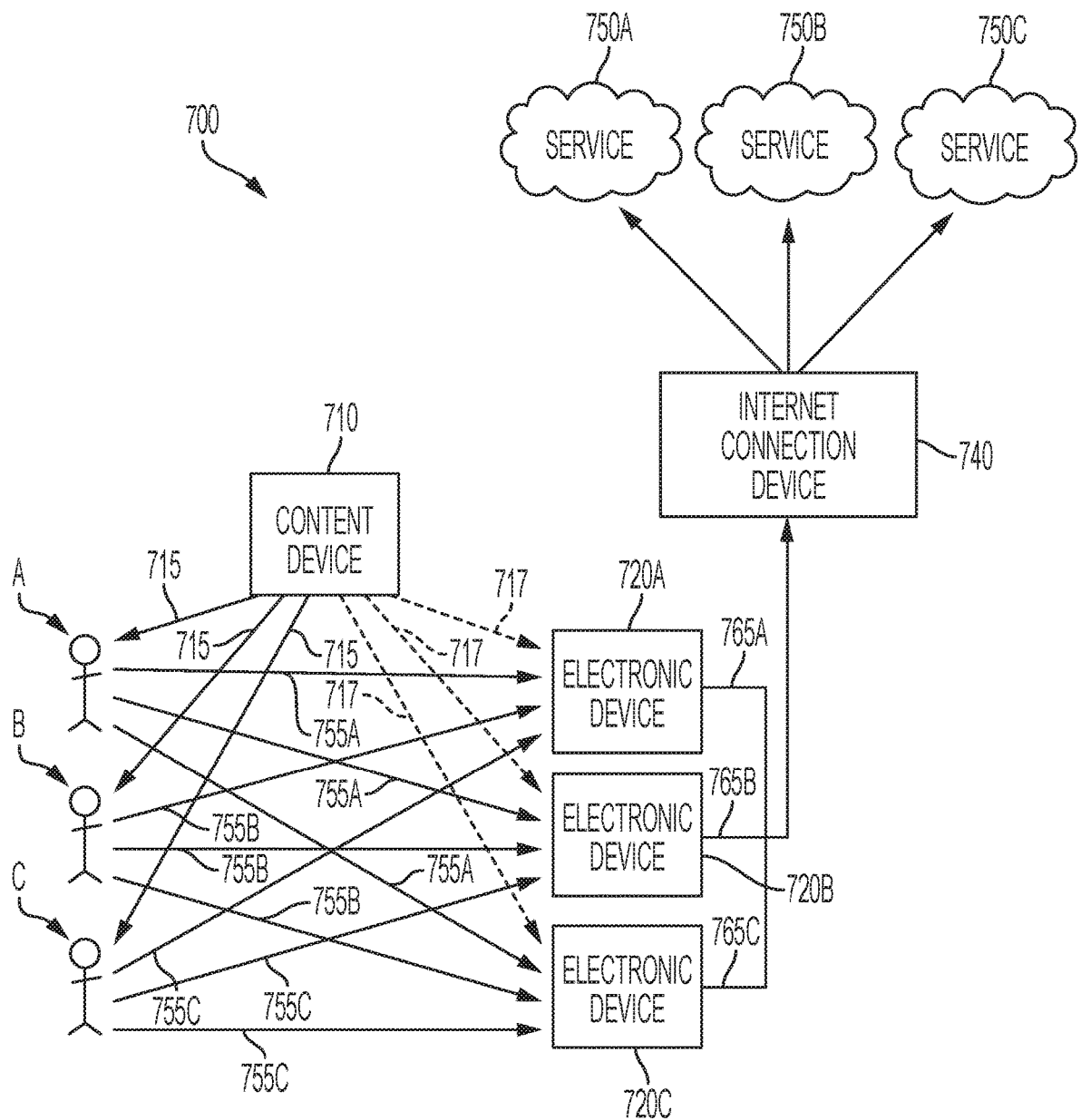
FIG. 7 is a functional block diagram of an example of a system with multiple electronic devices associated with multiple services and multiple users in accordance with one or more embodiments of this disclosure.

FIG. 7 is a functional block diagram of an example of a system 700 with multiple electronic devices associated with multiple services and multiple users in accordance with one or more embodiments of this disclosure. The system 700 includes a content device 710, an electronic device 720A, an electronic device 720B, and an electronic device 720C. Each electronic device 720A, 720B, and 720C is configured to communicate with a user, the content device 710, and an internet connection device 740. The internet connection device 740 is configured to communicate with one or more services, for example service 750A, service 750B, and service 750C. The content device 710, the electronic device 720A, the electronic device 720B, and the electronic device 720C may each include one or more components of the electronic device 200 shown in FIG. 2.

The system 700 is configured to detect an inaudible signal in content that is presented to a user and queue one or more of the electronic devices 720A, 720B, and 720C to respond in context of the content, as described above with reference to FIG. 3. Referring to FIG. 7, the content device 710 is configured to transmit content to the user. Examples of the content device 710 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 7, the content device 710 is configured to transmit content to one or more users, for example, user A, user B, and user C. The content may include audio content, video content, or both. The audio content may include audible signals, inaudible signals, or both. For example, the audio content may include an audible signal 715 that is paired or associated with an inaudible signal 717. The audible signal 715 may include an audible advertisement that is intended to elicit a response from the one or more users. The inaudible signal 717 may be paired with or associated with the audible signal 715. The inaudible signal 717 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 7, each of the electronic devices 720A, 720B, and 720C may be any device configured to interface with the one or more users A, B, C, and a source device (not shown). One or more of the electronic devices 720A, 720B, and 720C may include multi-mode capabilities, and may include multiple transceivers for communicating with different wireless networks over different wireless links. For example, each electronic device 720A, 720B, 720C may be configured to communicate with a device that employs a Bluetooth radio technology, and with a base station that employs an IEEE 802 radio technology. For example, each electronic device 720A, 720B, 720C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

Each of the electronic devices 720A, 720B, and 720C may receive an audio input. The audio input may include an audible signal, an inaudible signal, or both. In an example, each of the electronic devices 720A, 720B, and 720C may be configured to detect an inaudible signal in the audio input, for example the inaudible signal 717 from the content device 710. Each electronic device 720A, 720B, 720C may have a service associated with the respective electronic device 720A, 720B, 720C that may be configured to contact a service associated with the content device 710 via a service adapter (not shown). For example, electronic device 720A may be associated with service 750A, electronic device 720B may be associated with service 750B, and electronic device 720C may be associated with service 750C. A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 710, via the one or more services associated with the content device 710, may be configured to validate a user account and associate the user account with a user.

The one or more services associated with the content device 710 may be configured to open a communication link with the respective service associated with each of the electronic devices 720A, 720B, and 720C. The electronic devices 720A, 720B, and 720C, via the service associated with the electronic devices 720A, 720B, and 720C, may be configured to transmit a content ID to the service associated with the content device 710. Each of the electronic devices 720A, 720B, and 720C may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 717, the wake command of the inaudible signal 717, or both. Each of the electronic devices 720A, 720B, and 720C may activate the response monitor for a predetermined time. The response monitor may be a voice response monitor that is configured to monitor audio inputs for a user response.

As shown in FIG. 7, each electronic device 720A, 720B, and 720C receives user response 755A, 755B, 755C from user A, user B, and user C, respectively. Each user response 755A, 755B, 755C may be a voice input, a gesture, a text input, a touch input, or any suitable input. Each user response 755A, 755B, 755C may include a user identifier that identifies the user, for example a voiceprint associated with a user or user account or a gesture gait associated with a user or user account. Each of the electronic devices 720A, 720B, and 720C may be configured to determine whether the user identifier is associated with an authorized user account.

Each of the electronic devices 720A, 720B, and 720C may create a unique record for each of the received user responses 755A, 755B, 755C. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

Each of the electronic devices 720A, 720B, and 720C may be configured to respectively encode a unique record into message 765A, message 765B, and message 765C and respectively transmit the messages 765A, 765B, 765C to internet connection device 740. Each of the messages 765A, 765B, and 765C may be transmitted using RF or any suitable wired or wireless communication link. In an example, one or more of the electronic devices 720A, 720B, and 720C may be configured to authenticate each received user response, and transmit only the user responses that are associated with an authenticated (i.e., authorized) user account.

The internet connection device 740 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 740 may communicate with electronic devices 720A, 720B, 720C over an air interface, which may be any suitable wireless communication link, for example, RF, microwave, IR, UV, visible light, and the like. The internet connection device 740 may implement a radio technology such as IEEE 802.11 to establish a WLAN. The internet connection device 740 may implement a radio technology such as IEEE 802.15 to establish a WPAN. The internet connection device 740 may utilize a cellular-based access technology. Example cellular-based access technologies include WCDMA, GSM, LTE, LTE-A, and the like. As shown in FIG. 7, the internet connection device 740 may have a direct connection to one or more services, for example service 750A, service 750B, and service 750C. Alternatively, the internet connection device 740 may access the one or more services 750A, 750B, 750C via a core network (not shown). Each service 750A, 750B, 750C may include a global system of interconnected computer networks and devices that use common communication protocols, such as the TC, UDP and the IP in the TCP/IP internet protocol suite.

The internet connection device 740 may receive each of the messages 765A, 765B, and 765C and retrieve information regarding the advertisement based the one or more user responses 755A, 755B, 755C. For example, the internet connection device 740 may determine whether one or more of the received messages 765A, 765B, and 765C are duplicates based on one or more fields of the unique record including the date stamp, the time stamp, the content ID, the content device serial number, the content device manufacturer, the content device model, the content device IP address, the content device geographical location, the electronic device serial number, the electronic device manufacturer, the electronic device model, the electronic device IP address, the electronic device geographical location, one or more user responses, the user account, or the user ID associated with the user account.

In an example, if the internet connection device 740 determines that message 765A and 765B are both associated with the user A, the internet connection device 740 may transmit only message 765A or 765B to the respective service to avoid duplicate transmissions. In another example, the internet connection device 740 may transmit messages 765A, 765B, and 765C to each respective service 750A, 750B, 750C. In this example, each service 750A, 750B, 750C may be configured to log each message and retrieve and transmit a response based each message to the internet connection device 740. The information regarding the advertisement may be retrieved from one or more respective services. The information regarding the advertisement may be for a specific product or service based on the content ID. The information regarding the advertisement may be transmitted to one or more of electronic devices 720A, 720B, 720C or any other device for storage or presentation to one or more users without the users having to use any wake commands while interacting with the content. The information regarding the advertisement may be presented as an audio presentation, video presentation, or any other suitable presentation.

Figure 8:
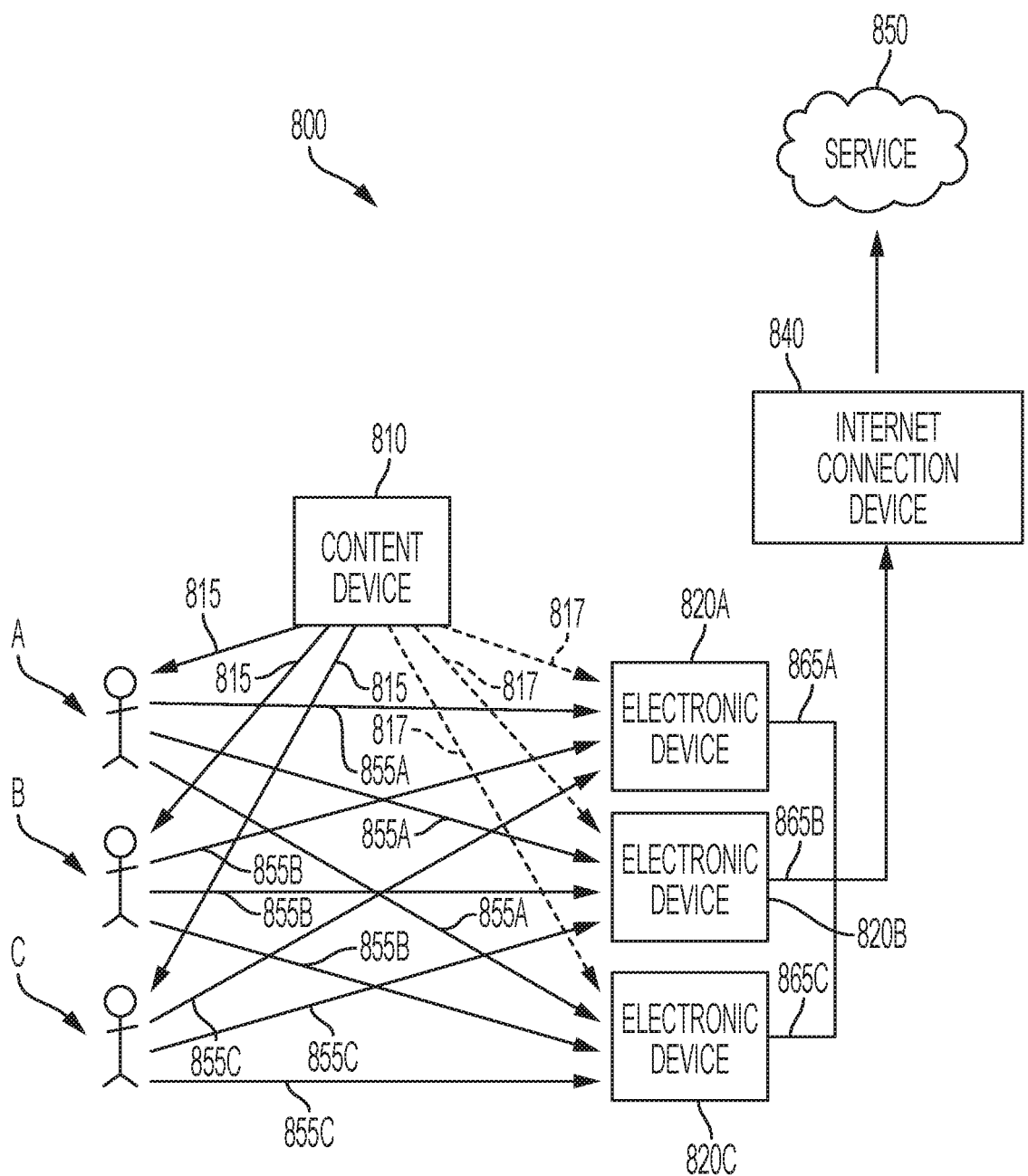
FIG. 8 is a functional block diagram of an example of a system with multiple electronic devices associated with a single service and multiple users in accordance with one or more embodiments of this disclosure.

FIG. 8 is a functional block diagram of an example of a system 800 with multiple electronic devices associated with a single service and multiple users in accordance with one or more embodiments of this disclosure. The system 800 includes a content device 810, an electronic device 820A, an electronic device 820B, and an electronic device 820C. Each electronic device 820A, 820B, and 820C is configured to communicate with a user, the content device 810, and an internet connection device 840. The internet connection device 840 is configured to communicate with service 850. The content device 810, the electronic device 820A, the electronic device 820B, and the electronic device 820C may each include one or more components of the electronic device 200 shown in FIG. 2.

The system 800 is configured to detect an inaudible signal in content that is presented to a user and queue one or more of the electronic devices 820A, 820B, and 820C to respond in context of the content, as described above with reference to FIG. 3. Referring to FIG. 8, the content device 810 is configured to transmit content to the user. Examples of the content device 810 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 8, the content device 810 is configured to transmit content to one or more users, for example, user A, user B, and user C. The content may include audio content, video content, or both. The audio content may include audible signals, inaudible signals, or both. For example, the audio content may include an audible signal 815 that is paired or associated with an inaudible signal 817. The audible signal 815 may include an audible advertisement that is intended to elicit a response from the one or more users. The inaudible signal 817 may be paired with or associated with the audible signal 815. The inaudible signal 817 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 8, each of the electronic devices 820A, 820B, and 820C may be any device configured to interface with the one or more users A, B, C, and a source device (not shown). One or more of the electronic devices 820A, 820B, and 820C may include multi-mode capabilities, and may include multiple transceivers for communicating with different wireless networks over different wireless links. For example, each electronic device 820A, 820B, 820C may be configured to communicate with a device that employs a Bluetooth radio technology, and with a base station that employs an IEEE 802 radio technology. For example, each electronic device 820A, 820B, 820C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

Each of the electronic devices 820A, 820B, and 820C may receive an audio input. The audio input may include an audible signal, an inaudible signal, or both. In an example, each of the electronic devices 820A, 820B, and 820C may be configured to detect an inaudible signal in the audio input, for example the inaudible signal 817 from the content device 810. Each electronic device 820A, 820B, 820C may have a service associated with the respective electronic device 820A, 820B, 820C that may be configured to contact a service associated with the content device 810 via a service adapter (not shown). In this example, electronic devices 820A, 820B, 820C are associated with service 850. A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 810, via the service 850 associated with the content device 810, may be configured to validate a user account and associate the user account with a user.

The service 850 associated with the content device 810 may be configured to open a communication link with the each of the electronic devices 820A, 820B, and 820C. The electronic devices 820A, 820B, and 820C, via the service 850 associated with the electronic devices 820A, 820B, and 820C, may be configured to transmit a content ID to the service associated with the content device 810. Each of the electronic devices 820A, 820B, and 820C may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 817, the wake command of the inaudible signal 817, or both. Each of the electronic devices 820A, 820B, and 820C may activate the response monitor for a predetermined time. The response monitor may be a voice response monitor that is configured to monitor audio inputs for a user response.

As shown in FIG. 8, each electronic device 820A, 820B, and 820C receives user response 855A, 855B, 855C from user A, user B, and user C, respectively. Each user response 855A, 855B, 855C may be a voice input, a gesture, a text input, a touch input, or any suitable input. Each user response 855A, 855B, 855C may include a user identifier that identifies the user, for example a voiceprint associated with a user or user account or a gesture gait associated with a user or user account. Each of the electronic devices 820A, 820B, and 820C may be configured to determine whether the user identifier is associated with an authorized user account.

Each of the electronic devices 820A, 820B, and 820C may create a unique record for each of the received user responses 855A, 855B, 855C. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

Each of the electronic devices 820A, 820B, and 820C may be configured to respectively encode a unique record into message 865A, message 865B, and message 865C and respectively transmit the messages 865A, 865B, 865C to internet connection device 840. Each of the messages 865A, 865B, and 865C may be transmitted using RF or any suitable wired or wireless communication link. In an example, one or more of the electronic devices 820A, 820B, and 820C may be configured to authenticate each received user response, and transmit only the user responses that are associated with an authenticated (i.e., authorized) user account.

The internet connection device 840 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 840 may communicate with electronic devices 820A, 820B, 820C over an air interface, which may be any suitable wireless communication link, for example, RF, microwave, IR, UV, visible light, and the like. The internet connection device 840 may implement a radio technology such as IEEE 802.11 to establish a WLAN. The internet connection device 840 may implement a radio technology such as IEEE 802.15 to establish a WPAN. The internet connection device 840 may utilize a cellular-based access technology. Example cellular-based access technologies include WCDMA, GSM, LTE, LTE-A, and the like. As shown in FIG. 8, the internet connection device 840 may have a direct connection to service 850. Alternatively, the internet connection device 840 may access the service 850 via a core network (not shown). The service 850 may include a global system of interconnected computer networks and devices that use common communication protocols, such as the TC, UDP and the IP in the TCP/IP internet protocol suite.

The internet connection device 840 may receive each of the messages 865A, 865B, and 865C and retrieve information regarding the advertisement based the one or more user responses 855A, 855B, 855C. For example, the internet connection device 840 may determine whether one or more of the received messages 865A, 865B, and 865C are duplicates based on one or more fields of the unique record including the date stamp, the time stamp, the content ID, the content device serial number, the content device manufacturer, the content device model, the content device IP address, the content device geographical location, the electronic device serial number, the electronic device manufacturer, the electronic device model, the electronic device IP address, the electronic device geographical location, one or more user responses, the user account, or the user ID associated with the user account.

In an example, if the internet connection device 840 determines that message 865A and 865B are both associated with the user A, the internet connection device 840 may transmit only message 865A or 865B to the service 850 to avoid duplicate transmissions. In another example, the internet connection device 840 may transmit messages 865A, 865B, and 865C to the service 850. In this example, the service 850 may be configured to log each message and retrieve and transmit a response based each message to the internet connection device 840. The information regarding the advertisement may be retrieved from one or more respective services. The information regarding the advertisement may be for a specific product or service based on the content ID. The information regarding the advertisement may be transmitted to one or more of electronic devices 820A, 820B, 820C or any other device for storage or presentation to one or more users without the users having to use any wake commands while interacting with the content. The information regarding the advertisement may be presented as an audio presentation, video presentation, or any other suitable presentation.

Figure 9:
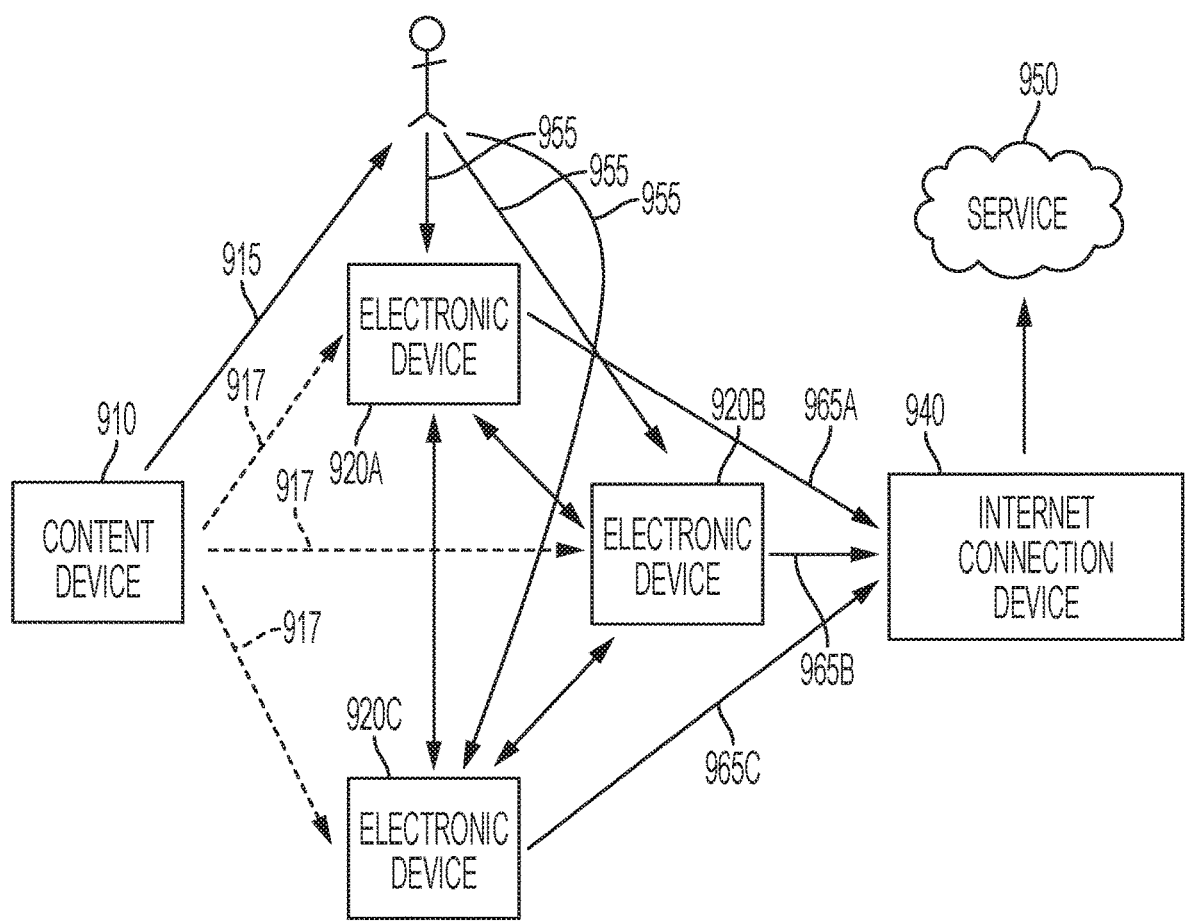
FIG. 9 is a functional block diagram of an example of a system with multiple electronic devices associated with a single service and a single user in accordance with one or more embodiments of this disclosure.

FIG. 9 is a functional block diagram of an example of a system 900 with multiple electronic devices associated with a single service and a single user in accordance with one or more embodiments of this disclosure. The system 900 includes a content device 910, an electronic device 920A, an electronic device 920B, and an electronic device 920C. Each electronic device 920A, 920B, and 920C is configured to communicate with a user, the content device 910, and an internet connection device 940. The internet connection device 940 is configured to communicate with service 950. The content device 910, the electronic device 920A, the electronic device 920B, and the electronic device 920C may each include one or more components of the electronic device 200 shown in FIG. 2.

The system 900 is configured to detect an inaudible signal in content that is presented to a user and queue one or more of the electronic devices 920A, 920B, and 920C to respond in context of the content, as described above with reference to FIG. 3. Referring to FIG. 9, the content device 910 is configured to transmit content to the user. Examples of the content device 910 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 9, the content device 910 is configured to transmit content to a user. The content may include audio content, video content, or both. The audio content may include audible signals, inaudible signals, or both. For example, the audio content may include an audible signal 915 that is paired or associated with an inaudible signal 917. The audible signal 915 may include an audible advertisement that is intended to elicit a response from the one or more users. The inaudible signal 917 may be paired with or associated with the audible signal 915. The inaudible signal 917 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 9, each of the electronic devices 920A, 920B, and 920C may be any device configured to interface with a user and a source device (not shown). One or more of the electronic devices 920A, 920B, and 920C may include multi-mode capabilities, and may include multiple transceivers for communicating with different wireless networks over different wireless links. For example, each electronic device 920A, 920B, 920C may be configured to communicate with a device that employs a Bluetooth radio technology, and with a base station that employs an IEEE 802 radio technology. For example, each electronic device 920A, 920B, 920C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

Each of the electronic devices 920A, 920B, and 920C may receive an audio input. The audio input may include an audible signal, an inaudible signal, or both. In an example, each of the electronic devices 920A, 920B, and 920C may be configured to detect an inaudible signal in the audio input, for example the inaudible signal 917 from the content device 910. Each electronic device 920A, 920B, 920C may have a service associated with the respective electronic device 920A, 920B, 920C that may be configured to contact a service associated with the content device 910 via a service adapter (not shown). In this example, electronic devices 920A, 920B, 920C are associated with service 950. A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 910, via the service 950 associated with the content device 910, may be configured to validate a user account and associate the user account with a user.

The service 950 associated with the content device 910 may be configured to open a communication link with the each of the electronic devices 920A, 920B, and 920C. The electronic devices 920A, 920B, and 920C, via the service 950 associated with the electronic devices 920A, 920B, and 920C, may be configured to transmit a content ID to the service associated with the content device 910. Each of the electronic devices 920A, 920B, and 920C may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 917, the wake command of the inaudible signal 917, or both. Each of the electronic devices 920A, 920B, and 920C may activate the response monitor for a predetermined time. The response monitor may be a voice response monitor that is configured to monitor audio inputs for a user response.

As shown in FIG. 9, each electronic device 920A, 920B, and 920C receives user response 955A, 955B, 955C from user A, user B, and user C, respectively. Each user response 955A, 955B, 955C may be a voice input, a gesture, a text input, a touch input, or any suitable input. Each user response 955A, 955B, 955C may include a user identifier that identifies the user, for example a voiceprint associated with a user or user account or a gesture gait associated with a user or user account. Each of the electronic devices 920A, 920B, and 920C may be configured to determine whether the user identifier is associated with an authorized user account.

Each of the electronic devices 920A, 920B, and 920C may create a unique record for each of the received user responses 955A, 955B, 955C. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

In an example, each of the electronic devices 920A, 920B, and 920C may be configured to respectively encode a unique record into message 965A, message 965B, and message 965C and respectively transmit the messages 965A, 965B, 965C to internet connection device 940. Each of the messages 965A, 965B, and 965C may be transmitted using RF or any suitable wired or wireless communication link. In an example, one or more of the electronic devices 920A, 920B, and 920C may be configured to authenticate each received user response, and transmit only the user responses that are associated with an authenticated (i.e., authorized) user account. In an example, each of the electronic devices 920A, 920B, and 920C may be configured to communicate with the other electronic devices. For example, electronic device 920A may be configured to communicate with electronic devices 920B, 920C, electronic device 920B may be configured to communicate with electronic devices 920A, 920C, and electronic device 920C may be configured to communicate with electronic devices 920A, 920B. Using the communication amongst themselves, electronic devices 920A, 920B, and 920C may determine if there are any duplicate messages, and one of the electronic devices 920A, 920B, 920C may be designated to transmit the one or more of the messages 965A, 965B, 965C that are non-duplicative.

The internet connection device 940 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 940 may communicate with electronic devices 920A, 920B, 920C over an air interface, which may be any suitable wireless communication link, for example, RF, microwave, IR, UV, visible light, and the like. The internet connection device 940 may implement a radio technology such as IEEE 802.11 to establish a WLAN. The internet connection device 940 may implement a radio technology such as IEEE 802.15 to establish a WPAN. The internet connection device 940 may utilize a cellular-based access technology. Example cellular-based access technologies include WCDMA, GSM, LTE, LTE-A, and the like. As shown in FIG. 9, the internet connection device 940 may have a direct connection to service 950. Alternatively, the internet connection device 940 may access the service 950 via a core network (not shown). The service 950 may include a global system of interconnected computer networks and devices that use common communication protocols, such as the TC, UDP and the IP in the TCP/IP internet protocol suite.

The internet connection device 940 may receive each of the messages 965A, 965B, and 965C and retrieve information regarding the advertisement based the one or more user responses 955A, 955B, 955C. For example, the internet connection device 940 may determine whether one or more of the received messages 965A, 965B, and 965C are duplicates based on one or more fields of the unique record including the date stamp, the time stamp, the content ID, the content device serial number, the content device manufacturer, the content device model, the content device IP address, the content device geographical location, the electronic device serial number, the electronic device manufacturer, the electronic device model, the electronic device IP address, the electronic device geographical location, one or more user responses, the user account, or the user ID associated with the user account.

In an example, if the internet connection device 940 determines that message 965A and 965B are both associated with the user A, the internet connection device 940 may transmit only message 965A or 965B to the service 950 to avoid duplicate transmissions. In another example, the internet connection device 940 may transmit messages 965A, 965B, and 965C to the service 950. In this example, the service 950 may be configured to log each message and retrieve and transmit a response based each message to the internet connection device 940. The information regarding the advertisement may be retrieved from one or more respective services. The information regarding the advertisement may be for a specific product or service based on the content ID. The information regarding the advertisement may be transmitted to one or more of electronic devices 920A, 920B, 920C or any other device for storage or presentation to one or more users without the users having to use any wake commands while interacting with the content. The information regarding the advertisement may be presented as an audio presentation, video presentation, or any other suitable presentation.

Figure 10:
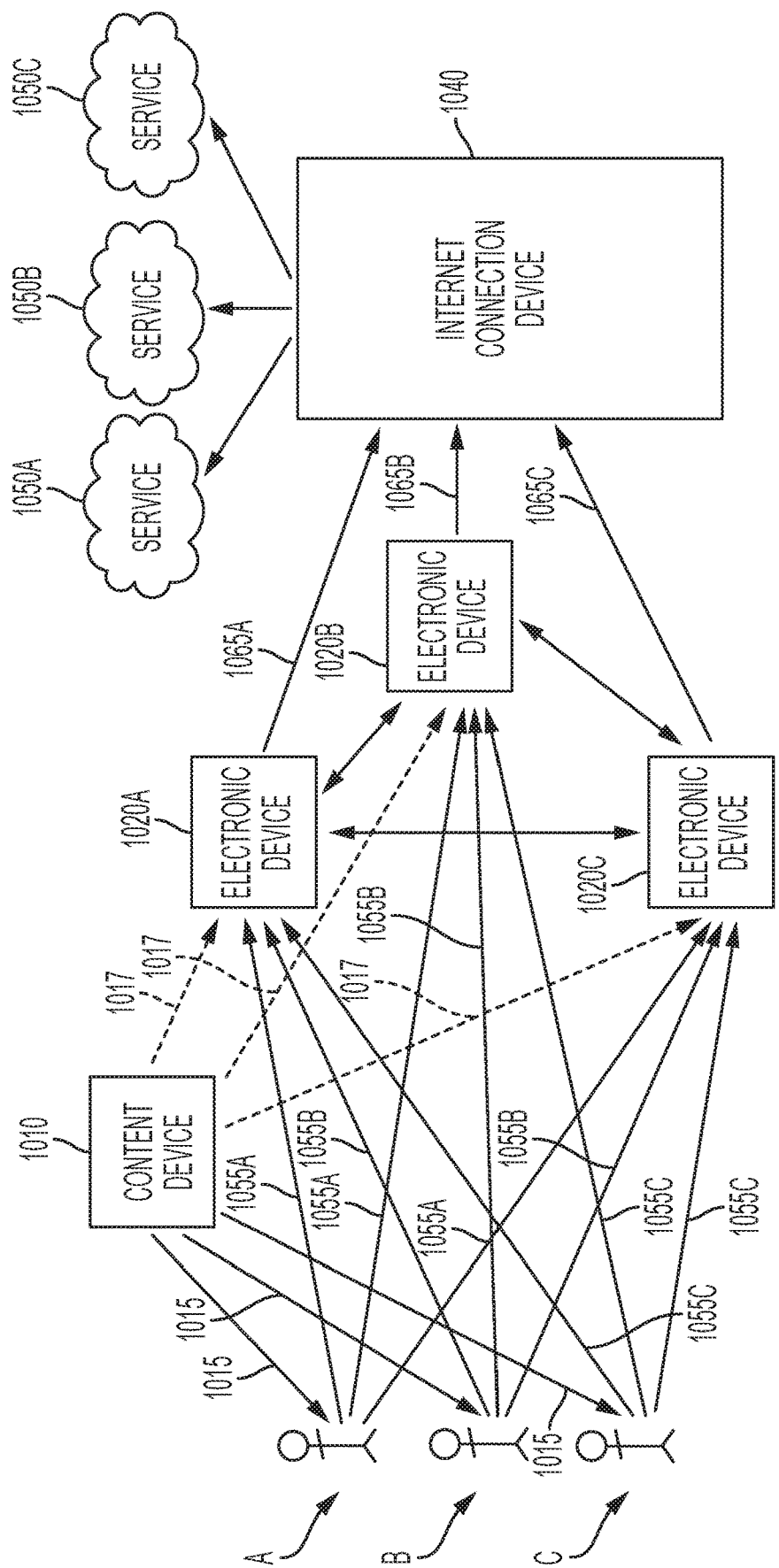
FIG. 10 is a functional block diagram of an example of a system with multiple electronic devices associated with multiple services that are configured to communicate with each other to determine duplicate inputs in accordance with one or more embodiments of this disclosure.

FIG. 10 is a functional block diagram of an example of a system 1000 with multiple electronic devices associated with multiple services that are configured to communicate with each other to determine duplicate inputs in accordance with one or more embodiments of this disclosure. The system 1000 includes a content device 1010, an electronic device 1020A, an electronic device 1020B, and an electronic device 1020C. Each electronic device 1020A, 1020B, and 1020C is configured to communicate with a user, the content device 1010, and an internet connection device 1040. The internet connection device 1040 is configured to communicate with one or more services, for example service 1050A, service 1050B, and service 1050C. The content device 1010, the electronic device 1020A, the electronic device 1020B, and the electronic device 1020C may each include one or more components of the electronic device 200 shown in FIG. 2.

The system 1000 is configured to detect an inaudible signal in content that is presented to a user and queue one or more of the electronic devices 1020A, 1020B, and 1020C to respond in context of the content, as described above with reference to FIG. 3. Referring to FIG. 10, the content device 1010 is configured to transmit content to the user. Examples of the content device 1010 include, and are not limited to, a TV, a PC, a tablet, a mobile phone, a gaming device, a satellite receiver, a terrestrial radio receiver, an audio receiver, an STB, a speaker, a camera, a personal wearable device, or an AR/VR device. The content may include audio content, video content, or both. Audio content may include streaming audio, recorded audio, broadcast audio, point-to-point audio, or any combination thereof. The audio content may include audible signals, inaudible signals, or both. For example, the audio content may include an audible signal that is paired or associated with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the audio signal. In an example, the content context may include an inference based on the content ID that may influence the meaning or effect of the audible signal, the inaudible signal, a portion of the inaudible signal such as the instruction, or any combination thereof. The source ID may be included to identify the source of the inaudible signal. The source ID may be used to identify that the associated audible signal originated at a source device as opposed to a user.

Video content may include streaming video, recorded video, broadcast video, point-to-point video, or any combination thereof. The video content may be associated or paired with an inaudible signal. The inaudible signal may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal. The audio content, video content, or both, may be in real-time or pre-recorded.

Referring to FIG. 10, the content device 1010 is configured to transmit content to a user. The content may include audio content, video content, or both. The audio content may include audible signals, inaudible signals, or both. For example, the audio content may include an audible signal 1015 that is paired or associated with an inaudible signal 1017. The audible signal 1015 may include an audible advertisement that is intended to elicit a response from the one or more users. The inaudible signal 1017 may be paired with or associated with the audible signal 1015. The inaudible signal 1017 may include a frequency signature, a wake command, an instruction, a content ID, a source ID, or any combination thereof. The frequency signature may be the frequency at which the inaudible signal is transmitted. The frequency signature may be associated with an electronic device type and may be used to distinguish between different types of electronic devices, for example, by manufacturer. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may indicate the advertisement and be used to determine a content characteristic, for example, a content context of the advertisement. In an example, the content context may include an inference based on the content ID that may influence the meaning or effect of the advertisement, the inaudible signal, a portion of the inaudible signal such as the instruction, or any combination thereof. In an advertisement example, the content ID may include information regarding a specific product.

As shown in FIG. 10, each of the electronic devices 1020A, 1020B, and 1020C may be any device configured to interface with a user and a source device (not shown). One or more of the electronic devices 1020A, 1020B, and 1020C may include multi-mode capabilities, and may include multiple transceivers for communicating with different wireless networks over different wireless links. For example, each electronic device 1020A, 1020B, 1020C may be configured to communicate with a device that employs a Bluetooth radio technology, and with a base station that employs an IEEE 802 radio technology. For example, each electronic device 1020A, 1020B, 1020C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, or an AR/VR device.

Each of the electronic devices 1020A, 1020B, and 1020C may receive an audio input. The audio input may include an audible signal, an inaudible signal, or both. In an example, each of the electronic devices 1020A, 1020B, and 1020C may be configured to detect an inaudible signal in the audio input, for example the inaudible signal 1017 from the content device 1010. Each electronic device 1020A, 1020B, 1020C may have a service associated with the respective electronic device 1020A, 1020B, 1020C that may be configured to contact a service associated with the content device 1010 via a service adapter (not shown). In this example, electronic devices 1020A, 1020B, 1020C are associated with service 1050A, service 1050B, and service 1050C, respectively. A service may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The content device 1010, via the one or more services 1050A, 1050B, 1050C associated with the content device 1010, may be configured to validate a user account and associate the user account with a user.

Each service 1050A, 1050B, 1050C associated with the content device 1010 may be configured to open a communication link with the each of the electronic devices 1020A, 1020B, and 1020C. The electronic devices 1020A, 1020B, and 1020C, via each service 1050A, 1050B, 1050C associated with the electronic devices 1020A, 1020B, and 1020C, may be configured to transmit a content ID to the service associated with the content device 1010. Each of the electronic devices 1020A, 1020B, and 1020C may be configured to activate a response monitor. Activating the response monitor may include activating a microphone, for example microphone 220 shown in FIG. 2. In some implementations, activating the response monitor may include activating a sensor to detect a user gesture or gait. Activating the response monitor may be responsive to a frequency signature of the inaudible signal 1017, the wake command of the inaudible signal 1017, or both. Each of the electronic devices 1020A, 1020B, and 1020C may activate the response monitor for a predetermined time. The response monitor may be a voice response monitor that is configured to monitor audio inputs for a user response.

As shown in FIG. 10, each electronic device 1020A, 1020B, and 1020C receives user response 1055A, 1055B, 1055C from user A, user B, and user C, respectively. Each user response 1055A, 1055B, 1055C may be a voice input, a gesture, a text input, a touch input, or any suitable input. Each user response 1055A, 1055B, 1055C may include a user identifier that identifies the user, for example a voice-print associated with a user or user account or a gesture gait associated with a user or user account. Each of the electronic devices 1020A, 1020B, and 1020C may be configured to determine whether the user identifier is associated with an authorized user account.

Each of the electronic devices 1020A, 1020B, and 1020C may create a unique record for each of the received user responses 1055A, 1055B, 1055C. The unique record may include one or more of a date stamp, a time stamp, a content ID, a content device serial number, a content device manufacturer, a content device model, a content device IP address, a content device geographical location, an electronic device serial number, an electronic device manufacturer, an electronic device model, an electronic device IP address, an electronic device geographical location, one or more user responses, a user account, or a user ID associated with the user account.

In an example, each of the electronic devices 1020A, 1020B, and 1020C may be configured to respectively encode a unique record into message 1065A, message 1065B, and message 1065C and respectively transmit the messages 1065A, 1065B, 1065C to internet connection device 1040. Each of the messages 1065A, 1065B, and 1065C may be transmitted using RF or any suitable wired or wireless communication link. In an example, one or more of the electronic devices 1020A, 1020B, and 1020C may be configured to authenticate each received user response, and transmit only the user responses that are associated with an authenticated (i.e., authorized) user account. In an example, each of the electronic devices 1020A, 1020B, and 1020C may be configured to communicate with the other electronic devices. For example, electronic device 1020A may be configured to communicate with electronic devices 1020B, 1020C, electronic device 1020B may be configured to communicate with electronic devices 1020A, 1020C, and electronic device 1020C may be configured to communicate with electronic devices 1020A, 1020B. Using the communication amongst themselves, electronic devices 1020A, 1020B, and 1020C may determine if there are any duplicate messages, and one of the electronic devices 1020A, 1020B, 1020C may be designated to transmit the one or more of the messages 1065A, 1065B, 1065C that are non-duplicative.

The internet connection device 1040 may be a wireless router, Home Node B, Home eNode B, or access point, for example, and may utilize any suitable access technology for facilitating wireless connectivity in a localized area, such as a home, a place of business, an educational facility, a vehicle, and the like. The internet connection device 1040 may communicate with electronic devices 1020A, 1020B, 1020C over an air interface, which may be any suitable wireless communication link, for example, RF, microwave, IR, UV, visible light, and the like. The internet connection device 1040 may implement a radio technology such as IEEE 802.11 to establish a WLAN. The internet connection device 1040 may implement a radio technology such as IEEE 802.15 to establish a WPAN. The internet connection device 1040 may utilize a cellular-based access technology. Example cellular-based access technologies include WCDMA, GSM, LTE, LTE-A, and the like. As shown in FIG. 10, the internet connection device 1040 may have a direct connection to service 1050. Alternatively, the internet connection device 1040 may access the service 1050 via a core network (not shown). The service 1050 may include a global system of interconnected computer networks and devices that use common communication protocols, such as the TC, UDP and the IP in the TCP/IP internet protocol suite.

The internet connection device 1040 may receive each of the messages 1065A, 1065B, and 1065C and retrieve information regarding the advertisement based the one or more user responses 1055A, 1055B, 1055C. For example, the internet connection device 1040 may determine whether one or more of the received messages 1065A, 1065B, and 1065C are duplicates based on one or more fields of the unique record including the date stamp, the time stamp, the content ID, the content device serial number, the content device manufacturer, the content device model, the content device IP address, the content device geographical location, the electronic device serial number, the electronic device manufacturer, the electronic device model, the electronic device IP address, the electronic device geographical location, one or more user responses, the user account, or the user ID associated with the user account.

In an example, if the internet connection device 1040 determines that message 1065A and 1065B are both associated with the user A, the internet connection device 1040 may transmit only message 1065A or 1065B to one or more of service 1050A, service 1050B, and service 1050C to avoid duplicate transmissions. In another example, the internet connection device 1040 may transmit messages 1065A, 1065B, and 1065C to one or more of service 1050A, service 1050B, and service 1050C. In this example, each service 1050A, 1050B, 1050C may be configured to log each message and retrieve and transmit a response based each message to the internet connection device 1040. The information regarding the advertisement may be retrieved from one or more respective services. The information regarding the advertisement may be for a specific product or service based on the content ID. The information regarding the advertisement may be transmitted to one or more of electronic devices 1020A, 1020B, 1020C or any other device for storage or presentation to one or more users without the users having to use any wake commands while interacting with the content. The information regarding the advertisement may be presented as an audio presentation, video presentation, or any other suitable presentation.

Figure 11:
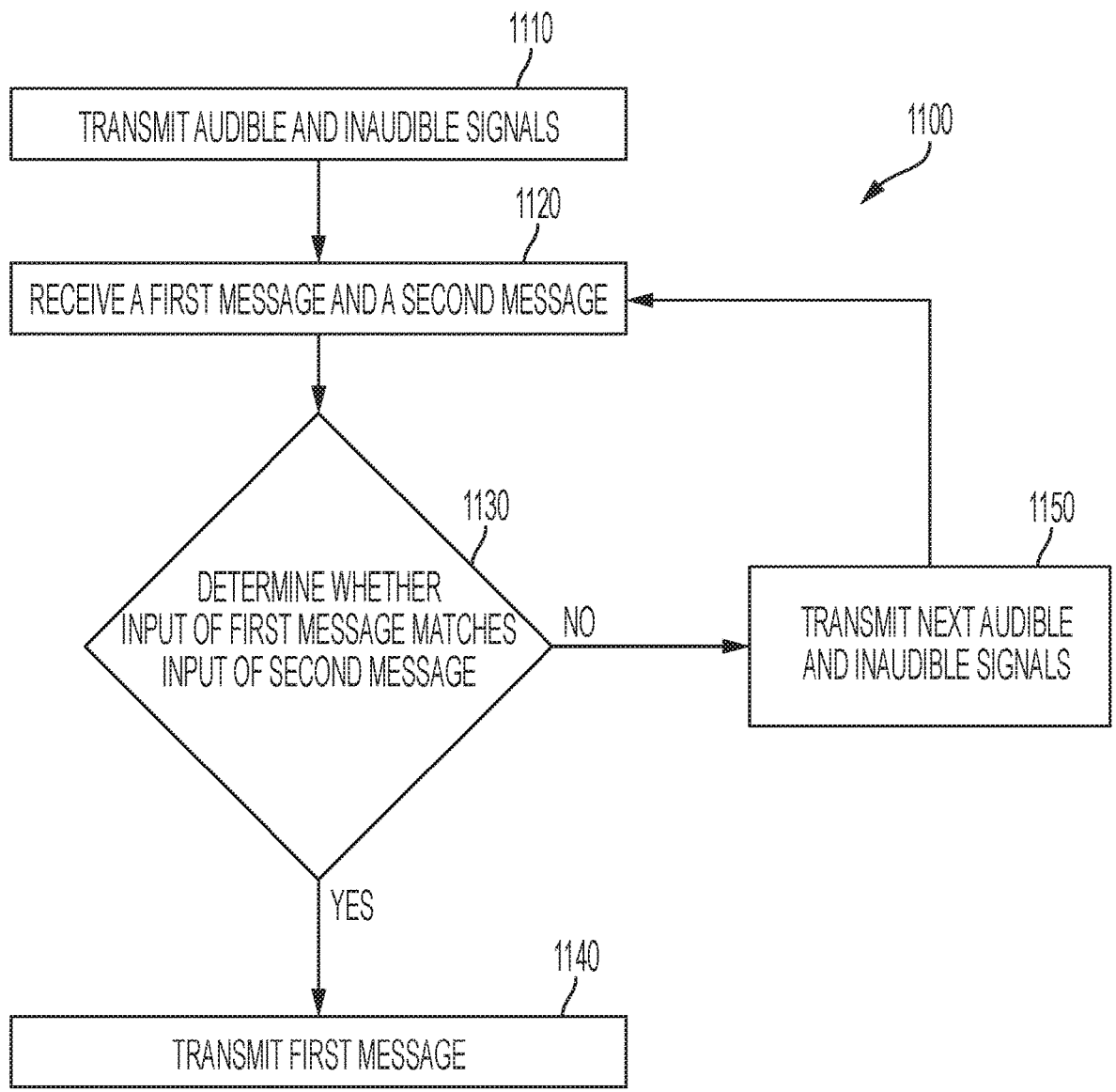
FIG. 11 is a diagram of an example of a method used to determine whether messages are duplicate messages in accordance with one or more embodiments of this disclosure.

FIG. 11 is a diagram of an example of a method 1100 used to determine whether messages are duplicate messages in accordance with one or more embodiments of this disclosure. The method 1100 may include transmitting 1110 an audible signal, an inaudible signal, or both to a first electronic device. The inaudible signal may be associated with a content identifier of the audible signal. The first electronic device may be associated with a first service. The method 1100 may include transmitting the audible signal, the inaudible signal, or both, to a second electronic device. The second electronic device may be associated with a second service. The method 1100 may include receiving 1120 a first message. The first message may include a first input. The first input may be associated with the content identifier. The method 1100 may include receiving a second message. The second message may include a second input. The second input may be associated with the content identifier. The method 1100 may include determining 1130 whether the first input matches the second input. The method 1100 may include transmitting 1140 the first message on a condition that the first input and the second input are determined to match. The method 1100 may include transmitting the second message on a condition that the first input and the second input are determined to match. If the input of the first message is determined not to match the input of the second message, the method 1100 may include transmitting 1150 a next audible signal and inaudible signal.

Although features and elements are described above in particular combinations, one of ordinary skill in the art will appreciate that each feature or element may be used alone or in combination with any of the other features and elements.

In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A content device configured to provide content to a user, the content device comprising:
    a transmitter configured to transmit content including an audible signal and an inaudible signal to a first electronic device associated with a first service and a second electronic device associated with a second service, wherein the inaudible signal is associated with a content identifier of the audible signal;
    a receiver configured to receive a first message that includes a first input associated with the content identifier and a second message that includes a second input associated with the content identifier; and
    a processor configured to determine whether the first input matches the second input;
    the transmitter further configured to transmit the first message to the first service and the second service on a condition that the first input and the second input are determined to match.

2. The content device of claim 1, wherein the receiver is configured to receive the first input or the second input as a voice input.

3. The content device of claim 1, wherein the receiver is configured to receive the first input or the second input as a gesture input.

4. The content device of claim 1, wherein the first input and the second input are associated with a first user identifier, the processor further configured to determine whether the first input matches the second input based on the first user identifier.

5. The content device of claim 1, wherein the first input is associated with a first user identifier and the second input is associated with a second user identifier, the processor further configured to determine whether the second user identifier is associated with an authorized user.

6. The content device of claim 5, wherein the transmitter is further configured to transmit the second message based on a determination that the second user identifier is associated with an authorized user.

7. The content device of claim 1, wherein the first message further includes a first electronic device identifier and the second message further includes a second electronic device identifier, the processor further configured to determine whether the first electronic device identifier matches the second electronic device identifier on a condition that the first input matches the second input.

8. The content device of claim 7, wherein the first electronic device identifier is a device name, a device serial number, an internet protocol (IP) address, a geolocation, or a user account identifier.

9. The content device of claim 7, wherein the second electronic device identifier is a device name, a device serial number, an internet protocol (IP) address, a geolocation, or a user account identifier.

10. A method comprising:
- transmitting, from a content device configured to provide content to a user, content including an audible signal and an inaudible signal to a first electronic device associated with a first service and a second electronic device associated with a second service, wherein the inaudible signal is associated with a content identifier of the audible signal;
- receiving, at the content device, a first message that includes a first input associated with the content identifier, and a second message that includes a second input associated with the content identifier;
- determining, at the content device, whether the first input matches the second input; and
- transmitting, from the content device, the first message to the first service and the second service on a condition that the first input and the second input are determined to match.

11. The method of claim 10, wherein the first input or the second input is a voice input.

12. The method of claim 10, wherein the first input or the second input is a gesture input.

13. The method of claim 10, wherein the first input and the second input are associated with a first user identifier, the method further comprising:
- determining whether the first input matches the second input based on the first user identifier.

14. The method of claim 10, wherein the first input is associated with a first user identifier and the second input is associated with a second user identifier, the method further comprising:
- determining whether the second user identifier is associated with an authorized user.

* * * * *